United States Patent
Ramboz et al.

(10) Patent No.: US 12,033,174 B2
(45) Date of Patent: *Jul. 9, 2024

(54) PROVIDING DISPLAY CONTENT USING RFID TAGS IN GEO-FENCED ZONES

(71) Applicant: Adobe Inc., San Jose, CA (US)

(72) Inventors: Julien Ramboz, Mateo, CA (US); Marie-Rose Ramboz, Mateo, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,964

(22) Filed: Dec. 11, 2022

(65) Prior Publication Data

US 2023/0111760 A1    Apr. 13, 2023

Related U.S. Application Data

(63) Continuation of application No. 16/939,582, filed on Jul. 27, 2020, now Pat. No. 11,538,056.

(51) Int. Cl.
*G06Q 30/02* (2023.01)
*G06K 7/10* (2006.01)
(Continued)

(52) U.S. Cl.
CPC ..... *G06Q 30/0223* (2013.01); *G06K 7/10138* (2013.01); *G06Q 10/087* (2013.01);
(Continued)

(58) Field of Classification Search
CPC .. G06Q 30/02; G06Q 30/0223; G06Q 10/087; G06Q 30/0206; G06Q 30/0269;
(Continued)

(56) References Cited

U.S. PATENT DOCUMENTS 9,549,282 B1 * 1/2017 McDonough ......... H04W 4/021
9,838,843 B1   12/2017 Bajaj et al.
(Continued)

FOREIGN PATENT DOCUMENTS

EP    2765551 A1 *  8/2014  ......... G06Q 30/0216
EP    2936414 A1 * 10/2015  ............. G06Q 30/02
(Continued)

OTHER PUBLICATIONS

Jeffrey D. Lindsay; Walter Reade;Larry Roth, Retail RFID Systems without Smart Shelves (English (United Stares)), The IP.com Prior Art Database, Dec. 23, 2003 (Year: 2003).*
(Continued)

*Primary Examiner* — Marilyn G Macasiano
(74) *Attorney, Agent, or Firm* — Kilpatrick Townsend & Stockton LLP

(57) ABSTRACT

Certain aspects involve systems and methods for providing display content using RFID tags in geo-fenced zones. One example method includes processing devices that perform operations that include scanning radio-frequency identification (RFID) tags in a geo-fenced zone. The RFID tags correspond to a plurality of items. Further, the operations include retrieving a marketing campaign associated with the plurality of items. The marketing campaign comprises rules based on inventory information. In addition, the operations include determining the inventory information for the plurality of items based on the RFID tags. The operations further include selecting an item from among the plurality of items based on a rule associated with the marketing campaign. The rule is based on the inventory information. Additionally, the operations include generating display content based on the item.

20 Claims, 8 Drawing Sheets

(51) Int. Cl.
*G06Q 10/087* (2023.01)
*G06Q 30/0201* (2023.01)
*G06Q 30/0207* (2023.01)
*G06Q 30/0251* (2023.01)
*H04W 4/021* (2018.01)
*H04W 4/80* (2018.01)

(52) U.S. Cl.
CPC ..... *G06Q 30/0206* (2013.01); *G06Q 30/0269* (2013.01); *H04W 4/021* (2013.01); *H04W 4/80* (2018.02)

(58) Field of Classification Search
CPC ........... G06Q 30/0276; G06Q 30/0254; G06Q 10/067; G06Q 30/0246; G06Q 30/0207; G06K 7/10138; G06K 19/0723; H04W 4/021; H04W 4/80
See application file for complete search history.

(56) References Cited

U.S. PATENT DOCUMENTS

| | | | |
|---|---|---|---|
| 10,008,056 | B2 | 6/2018 | Skonberg et al. |
| 10,083,453 | B2* | 9/2018 | Campbell .......... G06Q 30/0201 |
| 10,133,751 | B2 | 11/2018 | Fransen |
| 10,515,392 | B1* | 12/2019 | Gailloux ............... H04W 4/029 |
| 10,671,971 | B1* | 6/2020 | Nyswonger ........ G06K 7/10366 |
| 2008/0186167 | A1* | 8/2008 | Ramachandra .... G06Q 10/0875 340/572.1 |
| 2013/0145302 | A1 | 6/2013 | Young |
| 2013/0159135 | A1* | 6/2013 | Jones ..................... G06Q 10/08 705/26.8 |
| 2014/0129322 | A1 | 5/2014 | George et al. |
| 2014/0224867 | A1* | 8/2014 | Werner ................ G06Q 20/208 235/375 |
| 2015/0332212 | A1* | 11/2015 | Werner .............. G06Q 30/0251 235/375 |
| 2017/0149928 | A1 | 5/2017 | George et al. |
| 2018/0114168 | A1* | 4/2018 | Ryan ...................... G06Q 10/08 |
| 2018/0232767 | A1 | 8/2018 | Garg et al. |
| 2018/0349954 | A1 | 12/2018 | Mehta et al. |
| 2019/0072390 | A1* | 3/2019 | Wang ................. G06K 7/10386 |
| 2019/0075236 | A1* | 3/2019 | Cheung ..................... G06T 7/90 |
| 2019/0272557 | A1 | 9/2019 | Smith et al. |

FOREIGN PATENT DOCUMENTS

| | | | | |
|---|---|---|---|---|
| JP | 2014-154162 A | * | 8/2014 | ............. G06Q 30/02 |
| WO | 2018187788 A1 | | 10/2018 | |
| WO | WO 218/187788 A1 | * | 10/2018 | ............... G06K 9/20 |
| WO | 2019169207 A1 | | 9/2019 | |

OTHER PUBLICATIONS

Qi Xu, Improving responsiveness of supply chain through RFID visibility technology (English), 2009 IEEE/INFORMS International Conferenceon Service Operations, Logistics and Infomatics (pp. 513-517), Sep. 11, 2009 (Year: 2009).*

A. Bayraktar; E. Yilmaz, Implementation of RFID Technology for the Differentiation of loyalty Programs (Englsih), 2007 1st Annual RFID Eurasia (pp. 1-6), Mar. 3, 2008 (Year: 2008).*

A. Yaeli; P. Bak; G. Feigenblat; S. Nadler; H. Roitman; G. Saadoun; H.J.Ship; D. Cohen; O. Fuchs; S. Ofek-Koifman; T. Sandbank, Understanding cust beh using indoor loc analysis and visualization (Engl), IBM Journal of Research and Dev(vol. 58, Issue: 5/6, pp. 3:1-3:12), Sep. 1, 2014 (Year: 2014).*

Chia-Chen Chen; Mu-yen Chen; Nien-Chu Wu, Development of an RFID-based management system for fashion industry (English), 20107th International Conference on Service Systems and Servcie Management (pp. 1-6), Jun. 1, 2010 (Year: 2010).*

Sonia Hashish; Shaleeza Sohail, Exploiting RFID for real time accessing and translation of public advertisements (English), 2015 IEEE 11th International Conference on Wireless and Mobile Computing, Networking and Communications (WiMob) )pp. 37-42) , Oct. 1, 2015 (Year: 2015).*

U.S. Appl. No. 16/939,582 , "Final Office Action", Mar. 1, 2022, 25 pages.

U.S. Appl. No. 16/939,582 , "First Action Interview Office Action Summary", Aug. 26, 2021, 10 pages.

U.S. Appl. No. 6/939,582 , "First Action Interview Pilot Program Pre-Interview Communication", Jun. 23, 2021, 10 pages.

U.S. Appl. No. 6/939,582 , "Notice of Allowance", Aug. 23, 2022, 15 pages.

Lee et al., "Integration of RFID with Mobile Commerce for Consumer Marketing", IEEE International Conference on Industrial Engineering and Engineering Management, Dec. 8-11, 2008, pp. 1524-1528.

Lindsay et al., "Retail RFID Systems without Smart Shelves", IP.com Prior Art Database, Dec. 23, 2003.

* cited by examiner

PROVIDING DISPLAY CONTENT USING RFID TAGS IN GEO-FENCED ZONES

CROSS-REFERENCE TO RELATED APPLICATIONS

This application is a continuation of U.S. patent application Ser. No. 16/939,582, filed on Jul. 27, 2020, now allowed, the contents of all of which are incorporated herein by reference.

TECHNICAL FIELD

This disclosure relates generally to targeted display content using radio-frequency identification (RFID) tags. More specifically, but not by way of limitation, this disclosure relates to providing display content using RFID tags in geo-fenced zones.

BACKGROUND

Certain display programs include features for determining content that is derived based on geo-fences. Geo-fences are geographical boundaries that allow end users to receive location-based services. As one example, geo-fenced zones can be used to facilitate location-based notifications to end users. These notifications can include information related to marketing campaigns, strategies, promotions, advertisements, coupons, product availability, services, or other related items. Geo-fencing can be used for many different applications, such as, but not limited to, marketing, subscriptions, communications, inventory, productivity, transportation, workflow, and other location-based services.

Some existing computing systems may create and/or provide display content to digital signage, for example, in a retail environment. However, information used by some of these computing systems may quickly become stale as relevant conditions change within the applicable environment. This is especially true in a retail environment that can include a highly dynamic product layout. Frequent changes, e.g., during seasonal sales, may cause products to be moved around the retail environment and inventory levels to fluxuate.

Digital signage positioned throughout the environment will need to be updated to reflect information about products located near the signage; otherwise the display content will not be relevant to nearby products and therefore will not be helpful to customers. Prior art systems for generating display content for digital signage can therefore be inefficient and incapable of being updated in realtime to reflect dynamic conditions within the vicinity of the digital signage. Such systems require manual updates of the information used to generate relevant display content, which may cause the display content to lag behind real-time environmental conditions.

Some conventional systems include the various inefficiencies described above, which may also be exacerbated by densely populated areas of users. For example, many conventional systems define virtual boundaries around densely populated areas to ensure that a large number of people receive a given targeted display content. But such densely populated areas typically involve a trade-off—generally, the more nearby users that are present, the less targeted the display content may be, e.g., based on changing marketing campaigns, a presence of new users, processing inefficiencies related to the creation of the display content, etc. As a result, nearby users may become desensitized or disinterested in the targeted display content, and as a consequence, users may ignore subsequent display content. Thus, aspects described herein solve these problems by improving computer-implemented processes performed by providing display content using RFID tags in geo-fenced zones for a particular site location.

SUMMARY

Certain aspects involve providing display content to an end user using RFID tags in geo-fenced zones. For instance, aspects described herein can generate display content based on one or more RFID tags detected within a geo-fenced zone. One example method includes one or more processing devices that performs operations including scanning RFID tags in a geo-fenced zone. The RFID tags correspond to a plurality of items. Display content provided on digital signage within or proximate to the geo-fenced zone can be made to correspond to the items identified by the RFID tags. Further, the operations include retrieving a marketing campaign associated with the plurality of items. In addition, the operations include determining inventory information for the plurality of items based on the RFID tags. The operations further include selecting an item from among the plurality of items based on a rule associated with the marketing campaign. The rule is based on the inventory information. Additionally, the operations include generating display content for the digital signage based on the item.

These illustrative examples are mentioned not to limit or define the disclosure, but to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Figure 1:
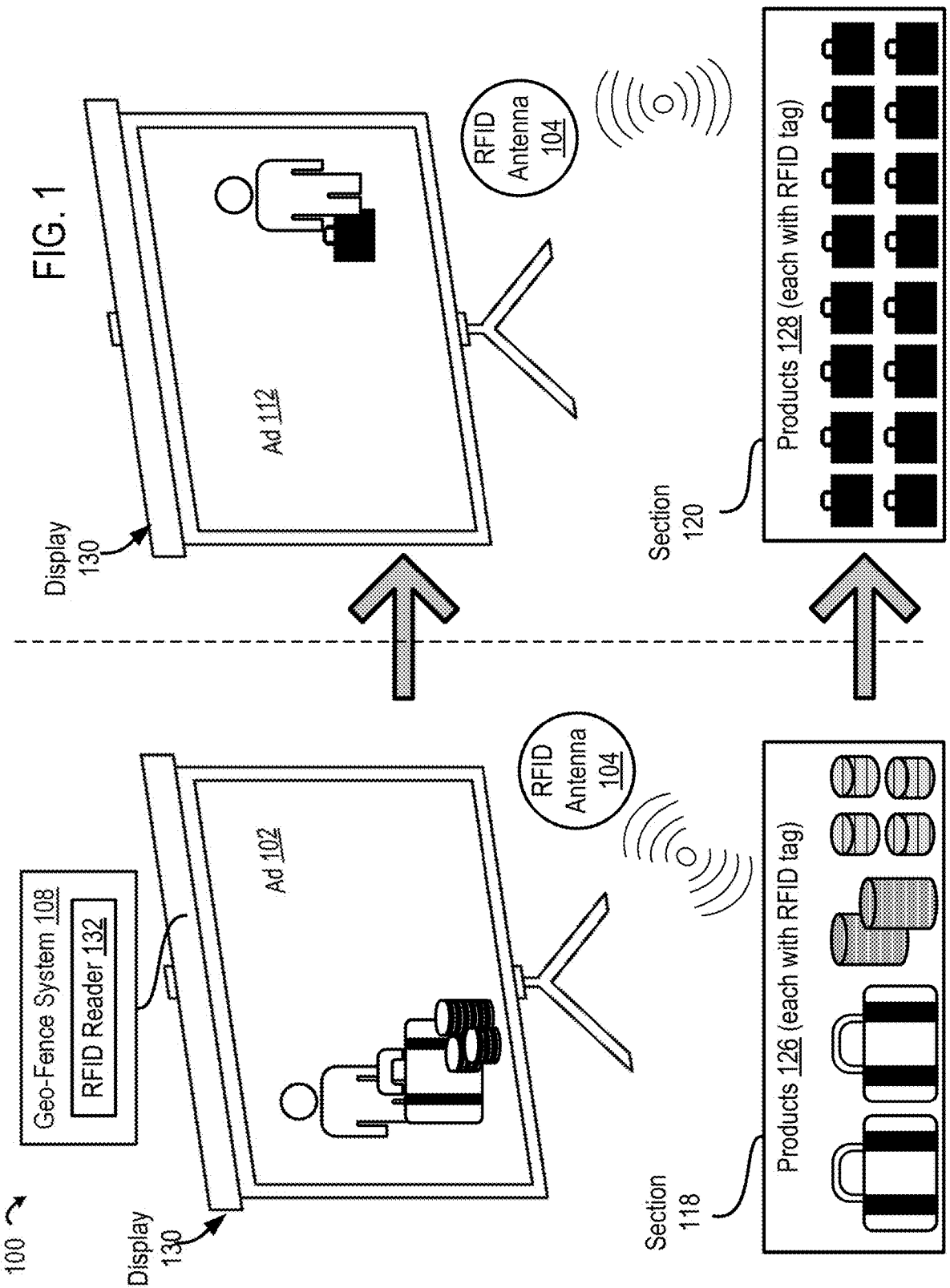
FIG. 1 depicts a simplified example computing environment for providing display content using RFID tags in geo-fenced zones, according to certain aspects of this disclosure.

As described herein, certain aspects provide improvements to computing systems used for providing display content. For instance, existing content display techniques can involve a retail environment with a highly dynamic product layout. These product layouts may change frequently, especially during seasonal sales, where products are moved around to increase visibility. Some retailers may use expensive marketing campaigns, e.g., using email newsletters, websites, or mobile apps, etc.

While digital signage may be easier to synchronize with marketing campaigns, existing solutions do not have access to information about which products are in their immediate vicinity, especially when various products sell, may be out of stock, or shelves are moved around during the week. This lack of awareness makes it hard to keep relevant content displayed on digital signage. In addition, content authors are not typically in-touch with any particular retail location, so many retailers end up re-running generic display content.

The combined effect of these problems is a poor end user experience caused by product layouts and digital signage that are frequently mismatched, unrelated, and out-of-sync. Providing up-to-date display content can be a time-consuming and expensive task that involves different people or entities, each of whom may not be on-site. Thus, aspects described herein improve computer-implemented processes performed by providing display content based on RFID tags in geo-fenced zones for a site location.

Certain embodiments of the invention involve the use of RFID tags to determine product availability, an end user's presence information, product recommendations, a user profile, or a combination of these. For example, certain aspects leverage UHF RFID antennas to scan RFID tags attached to, or otherwise associated with, products in a geo-fenced zone (e.g., a virtual perimeter circumscribing a multidimensional area) of a location. These RFID tags can be used to extract the 5-10 top products (or some other subset of the total number of products) that have the most occurrence in that area at any point in time. In addition, certain aspects provide dynamically run targeted context-aware digital signage or marketing campaigns that focus on these top products.

As a non-limiting example, a RFID antenna may be strategically placed in a section of a location, such as a store or other building. The RFID antenna may be strategically placed based on a reception radius around or a range of the RFID antenna. The RFID antenna receives signals from all of the RFID tags for products in the section of the retail store. The signals received from the RFID tags can include information about the products, such as identifying information.

A processing system receives the RFID tag information associated with products from the RFID antenna. The processing system determines inventory information based on the RFID tags. For example, each RFID tag may be coded with information, which may include a serial number, UPC, or SKU associated with a particular product (e.g., a specific model, type, category, brand, item number, related product, etc.). In this example, the processing system uses the received RFID tags to determine a count of a number of like products. For example, the processing system can determine the count by identifying products having the same product model number based on signals received from each of their corresponding RFID tag.

In addition, the processing system uses the count to determine the top products in the section. For instance, the processing system may determine the top 5 products for the section using an application programming interface (API). The processing system may retrieve a marketing campaign for the top 5 products based on the inventory information. For example, the processing system may retrieve the top 5 products for a sporting goods section of a retail store, for example, for a top 5 products that is based on the most occurrences in the section.

As a simplified example, the processing system may determine the top 5 products includes 5 different types of sports balls. In this example, the processing system sorts the top 5 products in a descending order, e.g., ordering the sports balls from most to least prevalent. For instance, the top 5 products may include 23 basketballs, 17 baseballs, 13 footballs, 12 volleyballs, and 9 tennis balls. Further, the processing system may exclude some sporting good balls based on inventory information indicating fewer occurrences than each of the top 5 sports balls (e.g., 4 lacrosse balls, 3 kickballs, 2 softballs, etc.). In some examples, the processing system may exclude certain types of sports balls based on one or more parameters. For example, the processing system may exclude 2000 golf balls because they may only be sold in bulk packages of 50 or 200. In other examples, the processing system may determine a top 5 products based on units (e.g., including multi-packages) instead of individual inventory items.

The processing system determines the display content needs to be updated. For example, the processing system may determine that the current display content is missing display content for a top 5 products that should be included in the display content (e.g., based on the applied rules). In response, the processing system can change the current display content that is output by the display device to include relevant display content based on the marketing campaign. In some examples, a relevance of the display content may be based on top products, inventory information, marketing campaigns, campaign rules, user profiles (e.g., potential customers in the vicinity of the display device), etc.

The processing system generates the display content based on the marketing campaign. The processing system can send the display content to a display device. For example, the processing system may be in electrical communication with the display device. The display device outputs the display content from the processing system, which may include, for example, content of interest provided to digital signage for products in the section of the retail store.

In one example, a user enters a retail store that includes the processing system above and is currently using digital signage to run various advertisements for winter clothing items and accessories. For example, the processing system may determine that one section of the retail store has a large quantity of red winter coats. In response, the processing system can generate a targeted advertisement for potential customers in the vicinity of the digital signage (e.g., in that section) that includes a video ad for red winter coats and related accessories.

In this example, the processing system regularly polls the RFID antenna for the section to scan a repositioning of inventory items or changes in inventory information. In some examples, the processing system can replace an advertisement in response to changes in location of an item, rack, shelving, etc. But in this example, the processing system receives new polling from the RFID antenna and determines an inventory count for red winter coats has diminished. Further, the processing system determines that blue winter coats are now the winter clothing item with the most occurrences in the section. In response to the updated inventory information, the processing system generates a video ad for blue winter coats and accessories that replaces the video ad for red winter coats on the digital signage in that section.

As used herein, a "geo-fenced zone" refers to a geographic region demarcated by a virtual boundary or perimeter. A virtual boundary of a geo-fenced zone can be defined as the locations and positions of walls, structures, buildings, addresses, zip codes, latitude and longitude coordinates, and/or the reception range of an antenna, scanner, or reader, etc. In one or more embodiments, a boundary of a geo-fenced zone refers to a boundary defined by the range or reception area of a RFID antenna. Alternatively, in one or more embodiments, the virtual boundary of a geo-fenced zone may be defined by a proximity to a fixed or moving point, such as a physical range of a wireless network (e.g., WiFi network), base station, one or more RFID tags, or another system having a fixed or variable range.

As used herein, a "geo-fence system" refers to a computing and communication based system that defines a geo-fenced zone and tracks devices as they cross the geo-fence boundary. Device positions relative to the geo-fenced zone can be detected using location based services enabled by GPS, radio-frequency, WiFi, Bluetooth and other protocols that can be used to determine the physical location of the device.

As used herein, a "RFID antenna" refers to an antenna that is capable of receiving and transmitting a signal that includes RFID tag information. RFID antennas receive RFID tag information by scanning or detecting RFID tags. Some RFID antennas can scan or detect RFID tags within a given range or radius. Examples of RFID antennas may include a linear polarization, circular polarization, monostatic circular, bistatic circular, dipole, crossed dipoles, helix, patch, loop, one-turn, multi-turn, decibel (dB), low frequency (LF), high frequency (HF), ultra-high frequency (UHF), active, passive, batter-assisted passive (BAP), or another type of RFID antenna.

As used herein, a "RFID reader" refers to a computing and communication based device that receives RFID tag information. RFID readers receive RFID tag information from RFID signals that are obtained by RFID antennas. RFID readers may house or be remotely located from a RFID antenna. RFID readers may be passive (e.g., capable of receiving RFID tag information from RFID tags that actively emit an RFID signal) or active (e.g., capable of receiving RFID tag information from RFID tags by emitting an RFID signal to interrogate nearby RFID tags). One example of a passive RFID reader is a passive reader active tag (PRAT) system. Examples of active RFID readers include an active reader passive tag (ARPT) system, active reader active tag (ARAT) system, or a battery-assisted passive (BAP) tag system. RFID readers may include one or more sensors (e.g., RFID sensors, GPS sensors, etc.), RFID antennas, types of RFID antennas, smart antennas, transcoders, transceivers, communication interfaces, firmware, etc.

As used herein, "inventory information" refers to information associated with one or more inventory items, such as products. Information associated with one or more inventory items may include information such as a count, type, classification, location, model, category, brand, and attributes, such as color, size and style, related items, associated events, etc. In one or more embodiments, inventory items can be identified using a barcode, serial number, universal product code (UPC), or stock-keeping unit (SKU).

As used herein, a "marketing campaign" refers to one or more forms of media content and delivery mechanisms that is strategically organized to achieve a specific goal. A marketing campaign can be defined according to a length of time, a location, an agenda, a particular events, an appearance, etc. In one or more embodiments, a marketing campaign can include content, such as an advertisement that promotes an item or a product using one or more types of media (print, audio, audiovisual, visual, email, SMS messages, etc.). Alternatively, in one or more embodiments, the marketing campaign may include an interactive platform, such as an online platform, marketing demonstration, survey, interactive video, etc.

As used herein, a "display content" refers to one or more forms of media generated for display. Display content can be defined by a media type, format, display medium, etc. In one or more embodiments, display content refers to content of interest. For example, display content may be content of interest to a user or an entity and can be provided to digital signage associated with a marketing campaign. Alternatively, in one or more embodiments, the display content may be defined by a data-triggered channel, an application (e.g., an AEM Screens application), a trigger or another timing element, an image, a video, a template, an existing content item, an initial content item, a layout, a structure, etc. Further, in one or more embodiments, the display content may include a time of day, marketing campaign, inventory information, user interactions, etc., or a combination of these.

As used herein, a "user profile" refers generally to information associated with one or more user traits, demographics and/or observable activities performed by a user. For example, a user profile may include information related to activities performed on a client device, e.g., while using a user application operating on the client device. A user profile may include information associated with these observable activities, which may include, but is not limited to, one or more user inputs, a location of a client device, a time of the activity, a browsing history, a purchase history, a user preference, a like, a dislike, other information associated with the user, an activity performed by the user, etc., or a combination of these. A user profile can further include information accessible to a user application such as one or more user permissions, images, purchase information, contacts, etc. As used herein, a user profile can refer to information associated with a plurality of activities performed by a user using a plurality of client devices and/or using a plurality of user applications.

As used herein, "personalized content" refers to display content associated with a user. Display content associated with a user can be defined based on a user profile. In one or more embodiments, personalized content refers to a marketing campaign tailored to the user.

Example Operating Environments for Providing Display Content Using RFID Tags in Geo-Fenced Zones Referring now to the drawings, FIG. 1 depicts an example computing environment 100 for providing display content based on using RFID tags in geo-fenced zones (e.g., sections 118, 120). The computing environment 100 includes a display device 130 that is communicatively coupled to a geo-fence system 108. The geo-fence system 108 includes a set of communicatively coupled components that can send and receive information, which is used to generate display content. The geo-fence system 108 may include one or more sensors, such as RFID readers 132.

For example, the geo-fence system 108 includes a RFID reader 132 and program code for rendering content for display (e.g., via display device 130). In some examples, rendering content for display may include rendering product or advertising content for display on digital signage (e.g., via display device 130) for a marketing campaign. Geo-fence system 108 can be implemented using one or more servers, platforms, cloud infrastructure, and the like.

In the example computing environment 100 depicted in FIG. 1, the geo-fence system 108 receives data from a RFID antenna 104. The RFID antenna 104 may be strategically placed in a location corresponding to the example computing environment 100. The RFID antenna 104 may scan RFID tags associated with one or more products 126 (each with a RFID tag), 128 (each with a RFID tag). The geo-fence system 108 receives data from the RFID antenna 104, e.g., using an RFID reader 132 and determines all of the products (e.g., products 126) nearby based on the RFID tags associated with the products 126 that are present in section 118 of the location.

In this example, the display 130 shown in FIG. 1 includes display content (e.g., advertisement 102) that corresponds to a person standing adjacent to luggage and three cylindrical standing duffel bags 126, each of which is outfitted with an RFID tag. In this example, geo-fence system 108 may have previously sent instructions to the display 130 to show ad 102 based on one or more scanned products 126 nearby. For instance, the nearby products 126 may include the same brand and/or manufacturer as is being displayed via ad 102. In this example, the ad 102 represents the current display content that is being output to the display device 130.

In this example, the geo-fence system 108 determines there is more relevant display content available. For example, the geo-fence system 108 may determine that ad 102 now includes less relevant display content than ad 112, e.g., based on a sensor signal from a sensor. In this example, the geo-fence system 108 may use the RFID reader 132 to send an interrogation signal to the RFID antenna 104 that causes the RFID antenna 104 to interrogate nearby RFID tags (e.g., the RFID tags associated with products 128 in section 120). The RFID antenna 104 interrogates (e.g., scans or senses) RFID signals emitted the nearby RFID tags, e.g. the RFID tags associated each of the products 128, and sends these RFID signals to the RFID reader 132. In some examples, the RFID reader 132 may include or otherwise be in communication with one or more RFID antennas 104.

The geo-fence system 108 receives the RFID signals from the RFID antenna 104 via RFID reader 132. Further, the geo-fence system 108 may determine that more relevant display content is available based on the RFID tag information from the RFID signals associated with products 128. For example, the ad 112 shown in FIG. 1 represents display content associated with products 128 (e.g., a smaller bag, briefcase, laptop bag, case, fashion handbag, etc.) that is different from the display content associated with products 126 shown in ad 102. In some examples, the geo-fence system 108 may determine relevance based on a marketing campaign, top products, inventory information, campaign rules, a presence of a user, etc., or a combination of these.

For illustrative purposes, FIG. 1 depicts a simplified computing environment 100 having a geo-fence system 108. But the geo-fence system 108 can include any number of systems, sub-systems, or program code(s) to generate display content, including digital signage for one or more marketing campaigns. Further, any number or type of images may be generated for display devices 130 with the geo-fence system 108.

Figure 2:
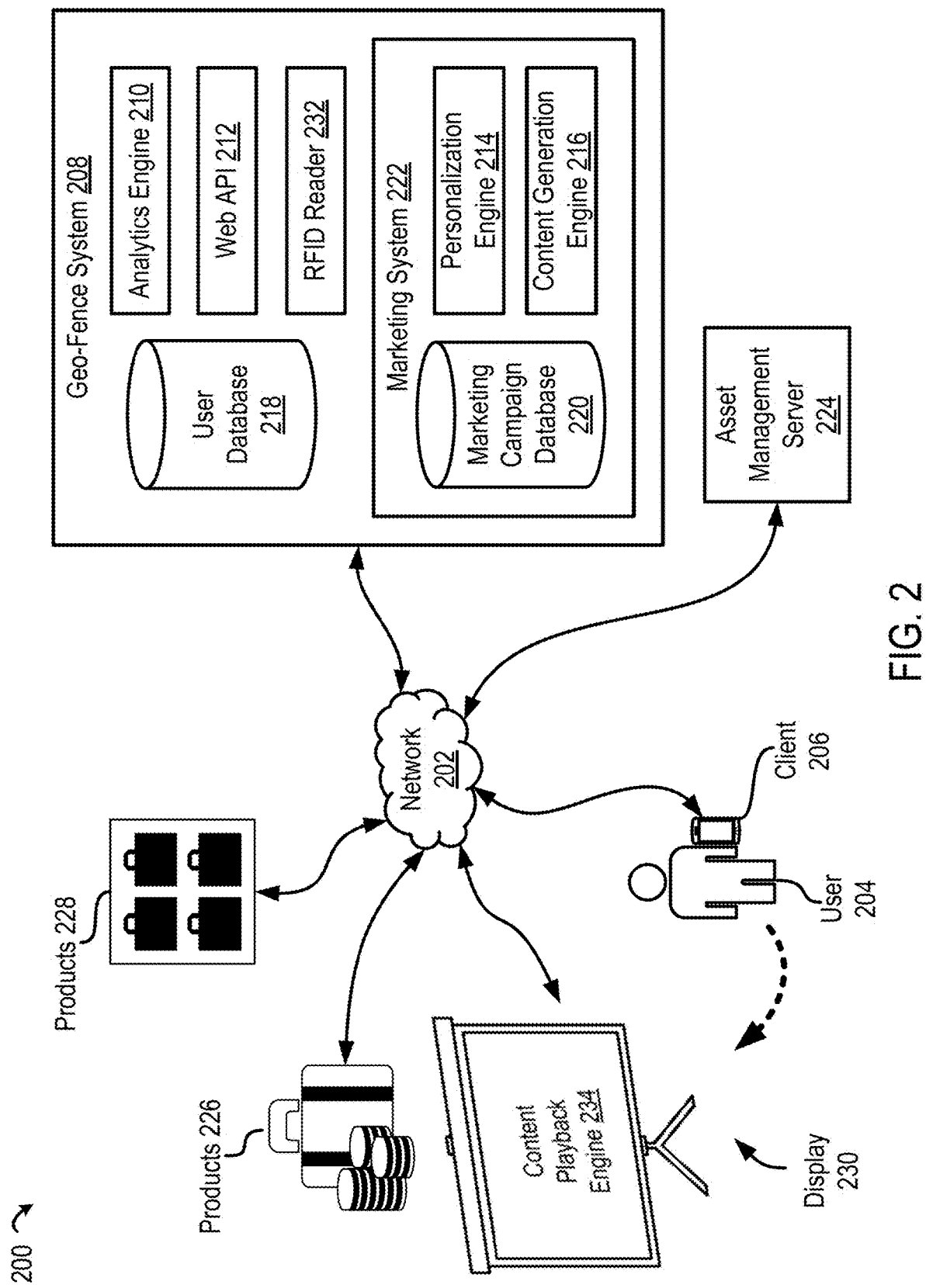
FIG. 2 depicts an example computing environment for providing display content using RFID tags in geo-fenced zones, according to certain aspects of this disclosure.

FIG. 2 depicts an example computing environment 200 for providing display content using RFID tags in geo-fenced zones. The computing environment 200 includes a display device 230 that is communicatively coupled to a geo-fence system 208 via data network 202. The geo-fence system 208 includes a set of communicatively coupled components that can send and receive information, which is used to generate display content. These components include an analytics engine 210, Web API 212, user database 218, marketing system 222, and RFID reader 232. Further, marketing system 222 includes a personalization engine 214, content generation engine 216, and marketing campaign database 220. In additional or alternative embodiments, a geo-fence system 208 and a marketing system 222 could be implemented in separate, independently operated computing systems that are communicatively coupled directly or indirectly via a data or other communication network. The geo-fence system 208 is also in communication with asset management server 224 and client device 206, e.g., via data network 202.

The geo-fence system 208 includes a RFID reader 232 and program code for an analytics engine 210, Web API 212, personalization engine 214, and content generation engine 216. For instance, the content generation engine 216 can include program code for rendering content for display, creating instances of event listeners or other suitable objects for receiving input from input devices (e.g., client device 206, mouse, touchscreen, etc.), and generating or displaying digital signage for a marketing campaign. The geo-fence system 208, as well as each engine, can be implemented using one or more servers, platforms with corresponding APIs, cloud infrastructure, and the like.

Examples of a client device 206 include, but are not limited to, a tablet, phablet, cell phone, smartphone, smart watch, gaming device, mobile device, IoT device, personal computer, desktop, server, processing unit, a combination of these devices, or any other suitable device having a processor. An end user 204 of client device 206 uses various products, applications, or services supported by the geo-fence system 208. Each of the client devices 206 are communicatively coupled to geo-fence system 208 via data network 202. Examples of the data network 202 include, but are not limited to, Internet, local area network ("LAN"), wireless area network, wired network, wide area network, and the like.

In the example computing environment 200 depicted in FIG. 2, the geo-fence system 208 receives data from a RFID antenna. The RFID antenna may be strategically placed in a section of a location corresponding to the example computing environment 200. The RFID antenna may be strategically placed based on a predetermined radius to scan RFID tags for products in the section. For example, the RFID antenna receives radio frequency (RF) signals by scanning RFID tags that are associated with the products 226 and products 228.

In this example, the products 226 shown in FIG. 2 represent luggage that includes, e.g., a suitcase adjacent to three cylindrical standing duffel bags. In this example, the products 226 includes the same brand and/or manufacturer. Further, the products 228 shown in FIG. 2 represent a product display (e.g., shelving) for smaller bags, which may include four briefcases, laptop bags or cases, fashion handbags, etc. Each of the products 226, 228 includes a RFID tag that emits a RF signal associated with the respective product. For example, these RF signals may include information such as encoding, printing, product, branding, pricing, identification, tracking, security, timing, or another type of information.

The geo-fence system 208 receives data from the RFID antenna, e.g., using the RFID reader 232. The RFID reader 232 reads or scans all of the RFID tags for products 226, 228 in the section of the location. Once obtained, the RFID reader 232 sends all of the RFID tags to the analytics engine 210.

The analytics engine 210 receives the RFID tags from RFID reader 232 and determines a count of similar products 226, 228. For example, the analytics engine 210 can compile a count of products 226, 228 in the form of inventory information. Further, the analytics engine 210 can determine the top products available in the section of the location. In some examples, the analytics engine 210 determines the top 5, 10, or any suitable number of products for the section based on the inventory information. In this example, the analytics engine 210 sends the top 2 products 226, 228 to the web API 212.

The web API 212 receives the top products 226, 228 from the analytics engine 210. In some examples, the web API 212 is a RESTful API. For example, the RESTful API may include a stateless session state, cacheable requests, uniform interface, layers, executable code in an applet or script, or a combination of these. Advantageously, the RESTful API may consume fewer valuable network resources (e.g., requiring less storage and bandwidth for frequent requests, such as updates for the latest marketing campaigns). The web API 212 uses the top products 226, 228 to retrieve a marketing campaign from the marketing campaign database 220. For example, the web API 212 may retrieve the marketing campaign that is associated with one or more of the top 2 products 226, 228.

In some examples, the web API 212 may request the marketing campaign from asset management server 224. Further, the asset management server 224 may be remotely located and may include marketing information for one or more sites or locations. For example, the asset management server 224 may be associated with one or more retail locations, chain restaurants, hotel or resort franchises, casino companies, etc. And in some examples, the asset management server 224 may include marketing information for marketing campaigns that can be targeted using local, regional, national, international, or global communication strategies.

In this example, the geo-fence system 208 uses marketing system 222 to determine the current display content output to the display device 230. In some examples, the marketing system 222 determines current display content, which may include a marketing campaign, e.g., from the marketing campaign database 220. But in this example, the marketing system 222 uses a personalization engine 214 to obtain inventory information and the top 2 products 226, 228 from the analytics engine 210, web API 212, or both.

The personalization engine 214 determines the current display content output to the display device 230 does not include the marketing campaign for a top 2 product 226 or 228 in the section. In response, the personalization engine 214 determines the display content output to the display device 230 should be changed. For example, the personalization engine 214 may send instructions to the content generation engine 216 to change the display content based on the inventory information, marketing campaign, top 2 products, or a combination of these. In some examples, the personalization engine 214 may have capabilities such as those of Adobe® Experience Manager (AEM), e.g., which may include automated tools for creating and managing various digital content, assets, communication forms or protocols, etc.

The content generation engine 216 receives the instructions from the personalization engine 214 and can change the display content that is output by the display device 230 to include relevant display content. In some examples, the relevance of the display content may be determined by the content generation engine 216. For example, the relevance may be based on top products, inventory information, marketing campaigns, campaign rules, user profiles (e.g., potential customers in the vicinity of the display device), or a combination of these. Further, the content generation engine 216 may determine an arrangement or an order of the display content based on the determined relevance of the display content.

In this example, the geo-fence system 208 provides display content to be output by display device 230. The geo-fence system 208 is in electrical communication with the display device 230. The geo-fence system 208 can use the content generation engine 216 to generate the display content. The display content may include, for example, digital signage for products in the section of the location (e.g., products 226, 228). In this example, the content generation engine 216 determines the display content includes marketing campaigns for one or more of the top 2 products in the section (e.g., products 226, 228). In response, the geo-fence system 208 transmits the display content to the display device 230.

The display device 230 may include a processor and program code that is executable by the processor. For example, the display device 230 includes program code for a content playback engine 234. The content playback engine 234 is an intelligent application that can leverage display content, e.g., provided by the personalization engine 214 and/or content generation engine 216. In some examples, the content playback engine 234 can dynamically switch display content for assets (e.g., products 226, 228) based on instructions from a remote computing device such as the asset management server 224. Further, the content playback engine 234 can dynamically switch display content that is local to a single display 230, instead of multiple displays 230 and/or client devices 206.

In some examples, the display content may include personalized display content, which may be displayed to the end user 204 as they approach the display device 230. As described below, with regard to examples in FIG. 4, a proximity of the end user 204 may be used to determine various user preferences and display content that is of particular interest to the end user 204, e.g., as they walk by a section. The personalized display content may be based on a user profile, preference, presence, proximity, etc.

For example, the geo-fence system 208 may output personalized display content based on information associated with a scanned RFID tag (e.g., RFID tag information for a mobile application associated with client device 206), a near-field communication (NFC) enabled client device 206, or other presence information (e.g., multiple points of presence (MPOP), instant message and presence protocol (IMPP), session initiation protocol for instant messaging and presence leveraging extensions (SIMPLE), extensible messaging and presence protocol (XMPP), etc.). In one example, the client device 206 may be a smartphone that includes NFC capabilities (e.g., NFC Type 5 Tags), which can be scanned by certain types of RFID antennas (e.g., HF or UHF RFID scanners). The geo-fence system 208 may output the personalized display content to the client device 206, display device 230, another client device, etc.

In one example, the display device 230 receives display content with a marketing campaign that includes an ad sequence. For instance, display content may include a designed ad sequence that includes four handbags corresponding to products 228 (e.g., handbag 1, handbag 2, handbag 3, and handbag 4). In this example, the designed ad sequence is ordered sequentially, first displaying handbag 1, then handbag 2, followed by handbags 3 and 4. But in this example, the ad sequence also includes alternative versions of handbag 2 (e.g., handbag 2a and handbag 2b). In some examples, handbags 2a and 2b may be versions of handbag 2 that include different colors, sizes, materials, zippers, fasteners, straps, compartments, accents, storage, tracking technologies, inserts, clasps, fasteners, hardware, other features, etc.

In this example, the content playback engine 234 receives instructions from the marketing system 222 (e.g., via the personalization engine 214 and/or content generation engine 216) to modify the display content by substituting the ad for handbag 2 with an ad for handbag 2a. Further, the content playback engine 234 can change the display content by switching the order of the ads. In some examples, the content playback engine 234 may modify or alter the display content based on locally cached display content. In additional or alternative embodiments, the content playback engine 234 can change display content when instructions are pushed down from a remote computing device (e.g., geo-fence system 208, marketing system 222, asset management server 224). Further, these changes may be sent in response to one or more changes to inventory information, campaigns, rules, etc. And in some examples, the content playback engine 234 may modify or alter display content based on pre-existing versions that were pre-pushed to the display device 230.

Pre-pushed ads or other display content can provide added flexibility, enabling the display device 230 and/or content playback engine 234 to switch ads locally, e.g., based on external rules and using cached display content. Advantageously, caching pre-pushed display content may save valuable network resources (e.g., bandwidth), while also providing a more responsive technique for ad switching. For example, the display device 230 may use content playback engine 234 to switch an ad locally for display content that includes personalized display content faster and more efficiently because an amount of time required to download a new JavaScript Object Notation (JSON) rule-set may be significantly less than an amount of time required to download new display content (e.g., HD, HDR, 4K, 8K, etc. display content).

For illustrative purposes, FIG. 2 depicts a geo-fence system 208 having a marketing system 222. But the geo-fence system 208 can include any number of systems, sub-systems, or program code(s) to generate display content, including content of interest provided to digital signage for one or more marketing campaigns. Further, any number or type of images may be generated for client devices 206 or display devices 230 with the geo-fence system 208.

Figure 3:
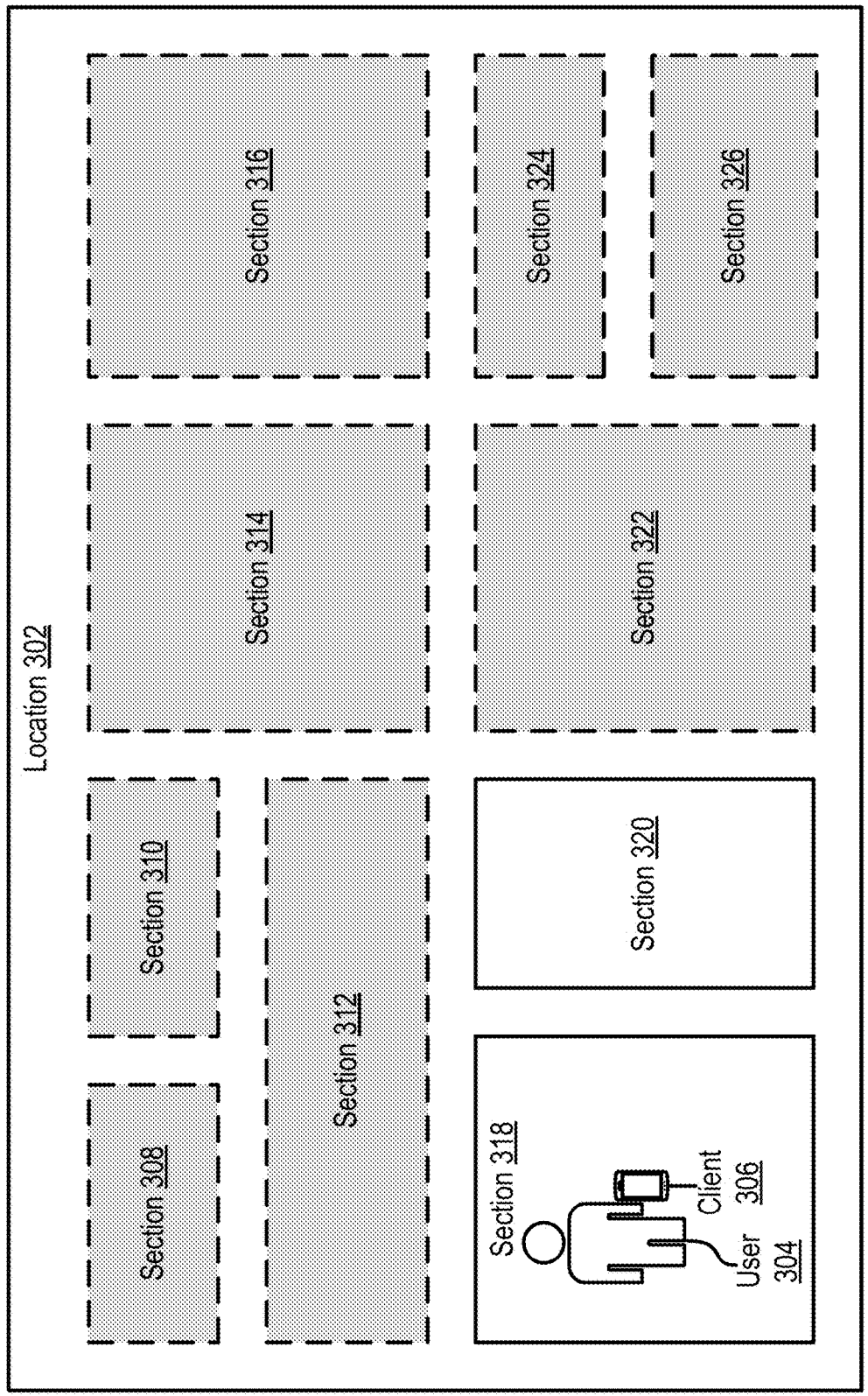
FIG. 3 depicts another example computing environment for providing display content using RFID tags in geo-fenced zones, according to certain aspects of this disclosure.

FIG. 3 depicts another example computing environment 300 for providing display content using RFID tags in geo-fenced zones, according to certain aspects of this disclosure. In this example, the computing environment 300 includes a location 302, which includes geo-fenced zones represented by sections 308, 310, 312, 314, 316, 318, 320, 322, 324, and 326. And in this example, an end user 304 has a client device 306 and is standing in the section 318 of the location 302. In some examples, client device 306 may perform substantially similar functions to those described above, with respect to client device 206 described in FIG. 2. Further, the example computing environment 300 may also include a network, geo-fence system, marketing system, asset management server, products, display, another component, or any of the components described above with regard to FIG. 2.

In this example, the location 302 illustrates spatial relationships, e.g., between the end user 304, having a client device 306 and being located in the section 318 and a proximity to the section 320. For instance, each of the sections 308-326 may represent a particular geo-fenced zone. As described in greater detail below, a geo-fence system may determine display content based on a number of parameters. And in some examples, the geo-fence system may determine the display content based on spatial relationships, e.g., between the end user 304, client device 306, products, a RFID antenna, sections (e.g., sections 318, 320).

For instance, each of the sections 318, 320 (e.g., similar to sections 418, 420 and sections 518, 520 described below) may have an overall size (e.g., three dimensional (3D), volumetric, footprint, two dimensional (2D), or other geometric measure), which can be used to determine a strategical placement of the RFID antenna. In some examples, the placement of the RFID antenna may be based on a scanning capability.

For example, the geo-fence system may select an overall size of each of the sections 308-326 based on a RFID range (e.g., a maximum read or scan distance) for the RFID antenna placed in that section. In some examples, the RFID antenna may capable of scanning a 3-5 meter radius. The geo-fence system may determine the strategic placement for RFID antenna using existing boundaries (e.g., walls, product sections, shelving, etc.), the RFID antenna's capabilities (e.g., range), etc. In some examples, the geo-fence system selects the strategic placement for RFID antenna to ensure an ability to scan all RFID tags within the area.

For example, the strategic placement may selected, e.g., using a centroid, near-centralized position, midpoint along a wall that is adjacent to the section, another relative point along 2D boundaries associated with the geo-fenced zone or section, etc. Further, the strategic placement may include 3D considerations, such as line-of-sight, electrical interference, total number of items, etc. These 3D considerations may be used by the geo-fenced system for a strategic placement that includes an elevated position (e.g., on a ceiling or adjacent wall).

In some examples, each of the sections 308-326 may correspond to a different section of a retail store (e.g., an appliances, electronics, health and beauty, home decor, men's clothing, perfume counter, seasonal items, snack bar, sporting goods, stationary, toys, women's clothing, or another retail section, etc.). In other examples, sections 308-326 can represent sections of an event, including sections for autographs, boards, classes, communities, conferences, courses, meetings, merchandisers, rooms, talks, theatre, vendors, etc. Further, sections 308-326 can include sections of a hotel or a casino. For example, sections 308-326 may be sections of a casino such as a cage, club, high limit card game or room, lobby, poker table, private room, restaurant, roulette, slot machine, sports book, table game, etc.

Figure 4:
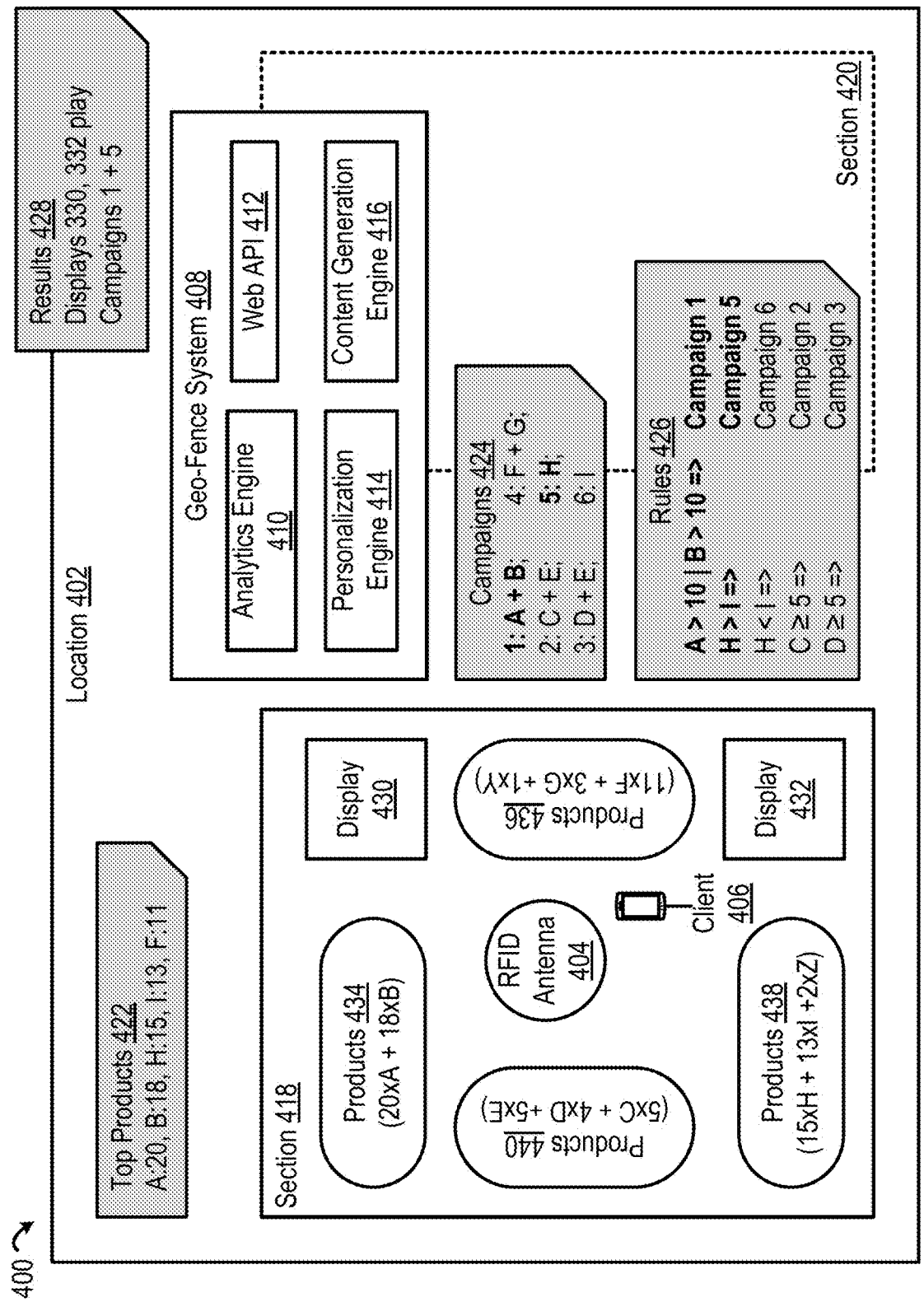
FIG. 4 depicts another example computing environment for providing display content using RFID tags in geo-fenced zones, according to certain aspects of this disclosure.

FIG. 4 depicts another example computing environment 400 for providing display content using RFID tags in geo-fenced zones, according to certain aspects of this disclosure. In this example, the computing environment 400 includes a location 402 that includes a geo-fence system 408. The geo-fence system 408 includes an analytics engine 410, Web API 412, a personalization engine 414, and a content generation engine 416. The location 402 is shown having geo-fenced zones represented by adjacent sections 418 and 420. Further, a client device 406 is present in the section 418 of the location 402. In some examples, each of the components of system 400 may perform substantially similar functions to those described above, with respect to substantially similar counterpart components described in FIGS. 1 and 2. In this example, the client device 406 is located in the section 418 and is in the vicinity (e.g., proximate to) a RFID antenna 404, display devices 430, 432, products 434, 436, 438, and 380. Further, the RFID antenna 404, client device 406, and display devices 430, 432 may be in wired and/or wireless communication with the geo-fence system 408.

In this example, the geo-fence system 408 determines top products 422. Further, the geo-fence system 408 uses top products 422, marketing campaigns (e.g., campaigns 424), and campaign rules (e.g., rules 426) to determine display content. For example, the geo-fence system 408 determines results 428 based on top products 422, campaigns 424, and rules 426. The geo-fence system 408 can execute content generation engine 416, which uses these results 428 to generate the display content. Further, the geo-fence system 408 can send the display content to the client 406, display devices 430, 432, or any combination of these.

For instance, the RFID antenna 404 scans RFID tags within a particular radius. In this example, the RFID antenna 404 can scan all of the RFID tags associated with products based on a predetermined radius, e.g., a radius that corresponds to products in section 418 of the location 402 (e.g., products 434-440). In some examples, the RFID antenna 404 may include a linear polarization, circular polarization, monostatic circular, bistatic circular, dipole, crossed dipoles, helix, patch, loop, one-turn, multi-turn, decibel (dB), low frequency (LF), high frequency (HF), ultra-high frequency (UHF), active, passive, batter-assisted passive (BAP), or any other suitable type of RFID antenna.

In some examples, an overall size or footprint of the section 418 may be based on a capability of the RFID antenna 404. For example, the overall size of the section 418 may be selected according to a RFID range (e.g., a maximum read or scan distance) associated with the RFID antenna 404. In one example, the RFID antenna 404 may include a UHF antenna that is capable of scanning, e.g., 50 tags/second for a 3-5 meter radius around the RFID antenna 404. Further, while the example system 400 shows a single RFID antenna 404, any suitable number of RFID antennas 404 may be strategically placed in section 418 to ensure sufficient coverage and reception of signals from the all of the RFID tags.

In this example, the RFID antenna 404 scans the products in section 418 based on an electrical signal from the geo-fence system 408. For example, the RFID antenna 404 receives the electrical signal from the geo-fence system 408, which triggers an electromagnetic interrogation pulse that scans all of the products in the section 418 (e.g., using RFID tags associated with each of the products 434-440). In some examples, after an initial scan, the RFID antenna 404 may scan for the RFID tags cyclically. For example, the RFID antenna may poll nearby inventory items by scanning for RFID tags intermittently, e.g., based on a predetermined interval, time duration, loop. The RFID antenna 404 transmits digital data that includes the scanned RFID tags to the geo-fence system 408.

In this example, the geo-fence system 408 receives the RFID tags from RFID antenna 404 and uses the analytics engine 410 to determine the top products 422 based on the RFID tags scanned by the RFID antenna 404. For example, the analytics engine 410 determines that the RFID tags includes a number of similar products included in products 434-440. Further, the analytics engine 410 can generate inventory information, for example, by counting and compiling a list of products for each subsection of the section 418.

For example, the analytics engine 410 determines the inventory information for a subsection corresponding to products 434 that includes a number RFID tags for 20 A inventory items (e.g., twenty occurrences of a RFID tag that is associate with an "A" product and/or inventory item) and 18 B inventory items (e.g., eighteen occurrences of a RFID tag that is associate with an "B" product and/or inventory item). Similarly, the analytics engine 410 determines a subsection corresponding to products 436 includes 11 F, 3 G, and 1 Y inventory items. Likewise, the analytics engine 410 determines that products 438 include 15 H, 13 I, and 2 Z inventory items, and products 440 include 5 C, 4 D, and 5 E inventory items. Each of these letters may correspond to an inventory item.

In some examples, each inventory item may be associated with a particular product or a type of a product. In other examples, analytics engine 410 may determine a number of items other than inventory items. For example, the analytics engine 410 may determine the items for RFID tags that includes forms of identification (e.g., an animal implant, bib for a participant in a running event, or conference attendee badge). In some examples, the analytics engine 410 determines items that include keycards (e.g., for a hotel, casino, room, lock, or another type of access control keycard).

Returning to the example system 400, the analytics engine 410 determines the top products 422 using an overall count of the inventory items. For example, the analytics engine 410 determines a total quantity for each inventory item, e.g., A-I, Y, and Z, in section 418. The analytics engine 410 sorts the quantified inventory items in a descending order, selecting a top 5 to generate top products 422, e.g., using scanned inventory items in section 418. The analytics engine 410 may select a top 1, 2, 3, 10, 20, or another suitable number of top products.

In some examples, the analytics engine 410 may select the top products 422 based on another sorting technique. For example, the top products 422 may be sorted in an ascending order (e.g., to advertise, reduce, or eliminate clearance inventory items). Further, the top products 422 may be compiled based on a parameter other than an inventory count. For example, the top products 422 may be determined using parameters such as demand, procurement costs, cycle times, ordering fees, inventory carrying costs, stock out levels, stock out costs, profit margins, revenue values, profit margins, etc. The analytics engine 410 provides the inventory information and top products 422 to the personalization engine 414.

In this example, the web API 412 retrieves campaigns 424 and rules 426 from a remote server (e.g., asset management server 224). In some examples, the web API 412 can retrieve campaigns 424 and rules 426 from a local marketing database or system (e.g., marketing campaign database 220 or marketing system 222, respectively). Once obtained, the web API 412 provides the campaigns 424 and rules 426 to the personalization engine 414.

The personalization engine 414 receives the inventory information and top products 422 from the analytics engine 410 and the campaigns 424 and rules 426 from the web API 412. The personalization engine 414 can determine the results 428 based on the inventory information, top products 422, campaigns 424, rules 426, or a combination of these. In this example, the personalization engine 414 determines the results 428 by applying the rules 426 to the campaigns 424 based on the top products 422. The campaigns 424 may include a marketing campaign, event campaign, seasonal campaign, another type of campaign, etc. In some examples, the personalization engine 414 can automatically determine the results 428, e.g., using AEM software.

In this example, the personalization engine 414 identifies six campaigns 424 that may be used to generate display content. Each of the six campaigns 424 includes one or more products. For example, campaign 1 includes products A and B, campaign 2 includes products C and E, campaign 3 includes products D and E, campaign 4 includes products F and G, campaign 5 includes product H, and campaign 6 includes product I. The personalization engine 414 uses top products 422 to determine which rules 426 apply to campaigns 424.

The personalization engine 414 applies the rules 426 in sequential order. For example, the personalization engine 414 uses the number of top products 422 to determine whether each rule applies in the order they appear in FIG. 4. To do so, the personalization engine 414 uses a number of A and B products from the top products 422 to determine whether to apply the first rule (e.g., "A>10|B>10=>Campaign 1").

For example, for the first rule to apply, personalization engine 414 must determine that either a number of A inventory items is greater than 10 or a number of B inventory items is greater than 10. Here, the personalization engine 414 determines the number of A inventory items is greater than 10 and the number of B inventory items is greater than 10. Since the first rule would be satisfied if either A or B inventory items have a quantity greater than 10, the personalization engine 414 determines campaign 1 should be included in the results 428.

Next, the personalization engine 414 determines whether a second rule applies, e.g., based on whether a number of H inventory items (e.g., 15) is greater than a number I inventory items (e.g., 13). Since the number of H inventory items is greater than the number of I inventory items, the personalization engine 414 determines the second rule applies and campaign 5 should be included in the results 428.

The personalization engine 414 also determines the remaining rules do not apply to the top products 422. For example, the personalization engine 414 determines a third rule is an inverse of the second rule. Because the second rule applies to the top products 422, the inverse of the second rule (i.e., the third rule) cannot also apply. In addition, personalization engine 414 determines the top products 422 do not include C or D inventory items. While products 440 include a quantity of 5 C inventory items, which appears to invoke a fourth rule that states if a number of C inventory items is greater than or equal to 5, then campaign 2 should be included in the results 428 (e.g., "C≥5=>Campaign 2"). But in this example, the personalization engine 414 excludes campaign 2 from the results 428 because the top products 422 only includes the top 5 products in section 418, which does not include C inventory items.

Advantageously, it may be desirable for personalization engine 414 to determine top products 422 using a limited number of inventory items (e.g., a top 5 products from an inventory count). By limiting the top products 422 to 5, personalization engine 414 can ensure a presence of a single item, a few misplaced items, or otherwise erroneously present item(s) does not cause an inappropriate or mistaken change to selected display content. Once determined, the personalization engine 414 sends results 428 to content generation engine 416.

The content generation engine 416 receives the results 428, which includes campaign 1 and campaign 5. The content generation engine 416 generates display content based on the results 428. For example, the content generation engine 416 can obtain the display content from a local marketing database or system (e.g., marketing campaign database 220 or marketing system 222, respectively). In some examples, the content generation engine 416 can obtain the display content from a remote location (e.g., asset management server 224). Once obtained, the content generation engine 416 can generate the display content. In this example, the content generation engine 416 can generates display content that includes products A, B, and H based on a presence of the campaigns 1 and 5 among the results 428.

In some examples, the content generation engine 416 automatically generates display content based on the results 428, e.g., using AEM software. For instance, the content generation engine 416 can execute an AEM Screens application that includes data-triggered channels based on one or more predefined conditions. Further, these predefined conditions can trigger playback of the display content, e.g., on display devices 430, 432. The data-triggered channels may include images or videos that may be pre-authored or authored using, e.g., a template, existing content, initial content, layout, structure, etc. Further, data-triggered channels may be triggered by predefined conditions such as a time of day, marketing campaign, inventory information, user interactions, etc. In this example, the content generation engine 416 sends the display content to the display devices 430, 432.

In some examples, the content generation engine 416 may also send the display content to a client device 406. For example, the RFID antenna 404 may scan a presence of the client device 406, e.g., based on a RFID or NFC tag (e.g., a NFC Type 5 Tag) that is associated with client device 406. The content generation engine 416 may determine the client device 406 is associated with a particular end user based on the RFID or NFC tag. For example, the content generation engine 416 can determine the presence of the client device 406 is associated with a user profile. To do so, the content generation engine 416 may query a user database (e.g., user database 218) to determine whether the client device 406 is associated with a user profile.

In some examples, the content generation engine 416 determines the user profile associated with the client device 406 includes user preferences for one or more products. In one example, the content generation engine 416 determines the user preferences are related to one or more products related to a product included in either of the campaigns 1 or 5. In this example, the content generation engine 416 determines the user preferences are related to products A and B. In response, the content generation engine 416 may generate personalized display content for the end user. Further, the personalized display content may include campaign 1 and exclude campaign 5 based on the user preferences.

In some examples, the content generation engine 416 may be in electrical communication with the client device 406. The content generation engine 416 can send the personalized display content to the client 406. Further, the content generation engine 416 may determine the end user is nearby, adjacent to, in proximity to, or otherwise in the vicinity of display device 432. And in some examples, the content generation engine 416 may send the personalized display content to the display device 432. Further, the content generation engine 416 can send the personalized display content to the client device 406, display device 432, another client device, etc., or a combination of these.

In some examples, the personalized display content may include a notification. The notification may include a particular product that is a sale item|, clearance item, low stock item. For instance, the content generation engine 416 may generate personalized display content that includes a notification based on the user profile. In some examples, the user profile may include an end user's browsing history, purchase history, or other activity data. Further, the notification may include a product that is similar to a product that the end user recently purchased, frequently purchased, previously researched, etc. In some examples, the geo-fence system 408 may protect the end user's privacy, for example, by sending personalized display content to the client device 406 (e.g., a smart watch) and not to either display device 430, 432.

In one example, a user enters a retail store (e.g. location 402), which includes the geo-fence system 408 described above. In this example, the displays 430 and 432 include digital signage that is currently running display content that includes advertisements for winter clothing items and accessories. Further, the display content includes a video ad for red winter coats based on previous inventory information indicating a large quantity of red winter coats. But in this example, the geo-fence system 408 detects a presence of the user based on a signal from the client device 406 (e.g., indicating a presence of the client device 406). Further, the geo-fence system 408 obtains user preferences based on the presence of the client device 406.

For instance, the geo-fence system 408 can use the user preferences to determine that the user prefers a particular color winter coat, e.g., blue winter coats. This user preference may be derived from a user's profile, browsing history, purchase history, or other activity data. In response to the presence of the user, the geo-fence system 408 can generate personalized display (e.g., a replacement video ad) with blue winter coats and accessories that replaces the video ad for red winter coats being output on display 430, 432, or both. In some examples, the user preferences may indicate preferences for a type of clothing item (e.g., sweaters, shirts, dresses, pants, etc.), gendered clothing (e.g., gender-neutral clothing, women's clothing, menswear, etc.), or another category of clothing item (e.g., athletic wear, athleisure wear, casual attire, dress clothing, formalwear, etc.). Further, the geo-fence system 408 can send the personalized display content to client device 406 using any of the techniques described herein.

In some examples, the inventory item may be associated with a bib number at a running event. For example, the bib may include a RFID tag and a RFID antenna 404 may be located in proximity to one or more sections of a race. For example, the RFID antenna 404 may be located near a start line, mileage marker, finish line, etc. Further, the inventory items may be used to determine an amount of progress, finish time, or item of interest.

For example, the RFID antenna 404 may scan that a runner finished a marathon. In response, the geo-fence system 408 can generate display content. Further, the display content may be a personalized display content with a notification message that includes, e.g., a congratulatory message with the user's name. In some examples, the notification message may include an advertisement, e.g., for a merchandiser. Further the merchandiser may related to the running event and include advertisements, such as beverages, athletic wear, running shoes, training equipment, etc. The notification message can be sent by geo-fence system 408 to client device 406, which may include, e.g., a smart watch, cell phone, or other mobile device.

In some examples, the inventory item may be associated with a special event. For example, the special event may require a badge or keycard that includes a RFID tag. For example, and a RFID antenna 404 may be located in proximity to one or more sections of the special event. For example, the special event may be located at a hotel or a casino and may include RFID antenna 404 near an entrance or exit. In one example, the inventory items may be associated with a badge that is used at a conference.

For example, an attendee of a comic book convention may receive messages or display content related to an agenda, different rooms, floors, events, appearances, etc., or a combination of these. Further, the attendee may receive personalized content based on a user profile or preference. For instance, the attendee may receive personalized display content that directs the attendee to one or more inventory items such as art displays, collectibles (e.g., action figures, toys, vintage comic books, comic book memorabilia, etc.), brands (e.g., Marvel Comics,™ DC Comics,™ Capcom,™ etc.), actors, comic book series or characters, robotics, photographs, autographs, costumes, books, etc.

In some examples, a "high roller" (e.g., a customer with spending parameters associated with their purchase history) may be able to gain access to certain rooms, floors, events, and the like based on RFID tag information associated with a RFID tag in their hotel keycard. Further, in some examples, an end user at the special event may use RFID tag information associated with their client device 406 in place of a badge or a keycard. For example, the end user may be a registered conference attendee, guest at the hotel, customer of the casino, etc. As part of the registration, the end user may use the RFID tag information associated with their client device 406 to create a user profile. The geo-fence system 408 can use the user profile to generate and send display content to client device 406 according to any of the techniques discussed herein.

Figure 5:
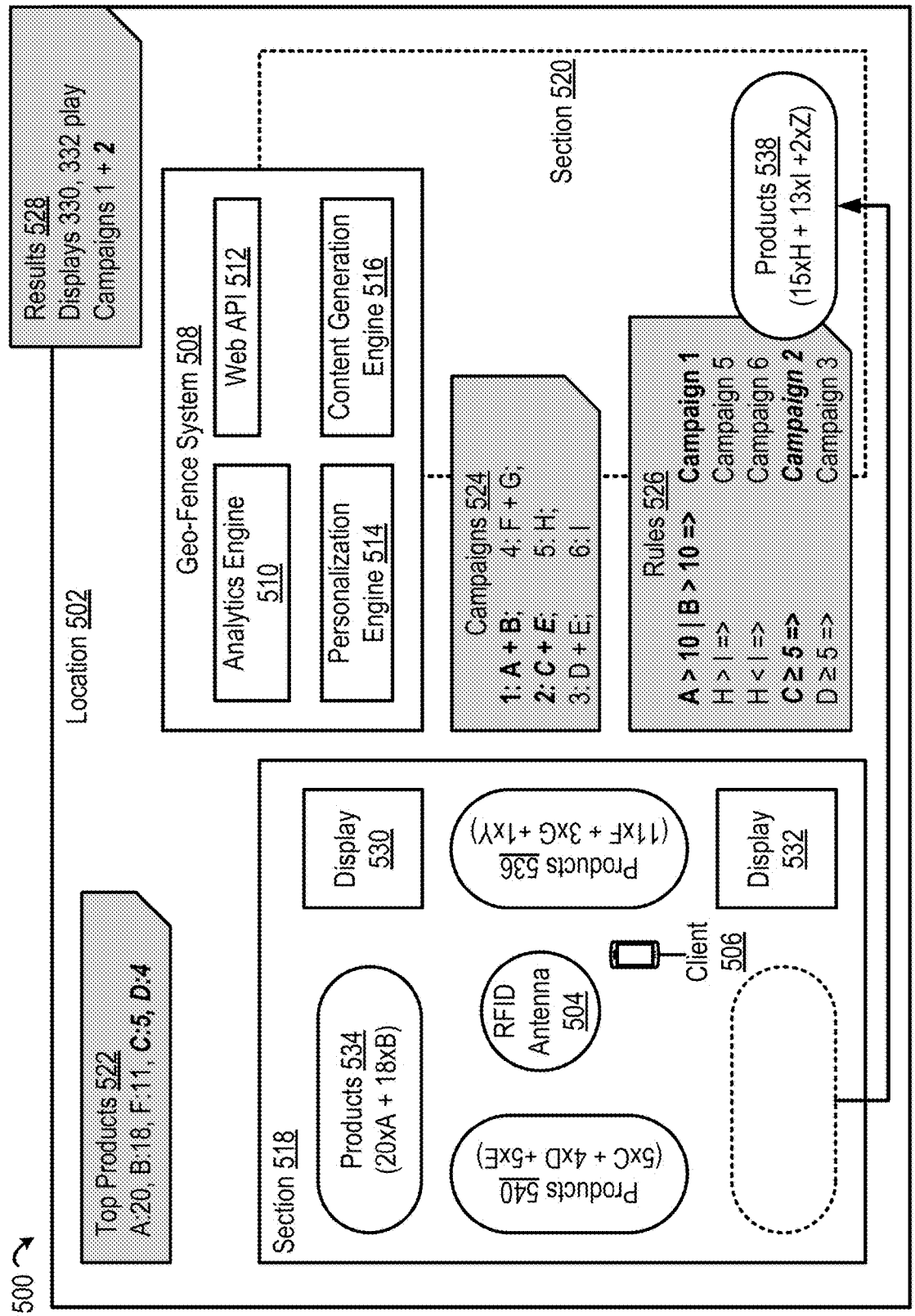
FIG. 5 depicts yet another example computing environment for providing display content using RFID tags in geo-fenced zones, according to certain aspects of this disclosure.

FIG. 5 depicts yet another example of a computing environment 500 for providing display content using RFID tags in geo-fenced zones, according to certain aspects of this disclosure. In this example, the computing environment 500 includes a location 502 that is similar to the location 402 of computing environment 400. For example, location 502 includes a RFID antenna 504, client device 506, geo-fence system 508, analytics engine 510, web API 512, personalization engine 514, content generation engine 516, adjacent sections 518 and 520. Further, a client device 506 is present in the section 518 and is in the vicinity of the RFID antenna 504, display devices 530, 532, products 534, 536, and 480. The RFID antenna 504, client device 506, and display devices 530, 532 are in electrical communication with the geo-fence system 508. In some examples, the components shown in computing environment 500 may include substantially similar capabilities to those described above with respect to like components shown in FIG. 4. But in this example, the geo-fence system 508 determines results 528 based on a change in top products 522, campaigns 524, and rules 526. The geo-fence system 508 determines the results 528 based on a relocation of products 538 to section 520.

In this example, the geo-fence system 508 determines top products 522 and uses the top products 522, campaigns 524, and rules 526 to determine display content. For example, the geo-fence system 508 determines results 528 based on a change in the top products 522 that occurs when the products 538 are relocated to section 520. In some examples, geo-fence system 508 scans the location 502 periodically (e.g., at predetermined intervals or time durations), e.g., by sending an electrical signal to the RFID antenna 504. In this example, the RFID antenna 504 scans all of the RFID tags in the section 518 (e.g., associated with products 534, 536, and 540) and transmits the scanned RFID tags to the analytics engine 510.

The analytics engine 510 receives the RFID tags from RFID antenna 504 and determines the top products 522. In this example, the analytics engine 510 determines a change in products in section 518 based on a comparison between past inventory information and received RFID tags. For example, the analytics engine 510 determines the RFID tags no longer include products 538. Further, the analytics engine 510 may update the inventory information based on the products still present in section 518 (e.g., products 534, 536, and 540).

As described above, the analytics engine 510 determines the inventory information for subsections corresponding to the remaining products 534, 536, 540. In this example, the analytics engine 510 determines products 534 includes 20 A and 18 B inventory items, products 536 includes 11 F, 3 G, and 1 Y inventory items, and products 440 include 5 C, 4 D, and 5 E inventory items. Further, the analytics engine 510 determines each of the counts for products 534, 536, 540 are the same as the past inventory information (e.g., each of the counts for the inventory items for products 534, 536, 540 are the same as the counts for the inventory items for products 436, 440). Thus, the analytics engine 510 determines there is no update required for the inventory information associated with the scanned products 534, 536, 540.

In this example, the analytics engine 510 also determines products 538 previously included 15 H, 13 I, and 2 Z inventory items (e.g., based on a scan of products 438). In response to the change in inventory items, analytics engine 510 updates inventory information and the top products 522. For example, analytics engine 510 determines the top products 522 using an overall count of the inventory items and sorts the quantified inventory items in descending order and selects top products 522 (e.g., the top 5 products based on a descending order of quantity from greatest quantity to the smallest quantity). The analytics engine 510 provides the inventory information and top products 522 to personalization engine 514.

In parallel, web API 512 retrieves campaigns 524 and rules 526 from a remote server. The web API 512 provides campaigns 524 and rules 526 to the personalization engine 514. The personalization engine 514 receives the inventory information and top products 522 from the analytics engine 510. Further, the personalization engine 514 receives campaigns 524 and rules 526 from the web API 512. The personalization engine 514 uses top products 522 to determine which of the five rules 526 to apply to the six campaigns 524, e.g., by analyzing whether each rule applies in a sequential order of appearance (e.g., from top to bottom).

For example, the personalization engine 514 uses a number of A and B inventory items, from the top products 522, to determine the number of A inventory items and number of B inventory items are both greater than 10, so the first rule still applies and campaign 1 should still be included in results 528. But in this example, the personalization engine 514 determines the rules 526 include a second rule and third rule that do not apply. For example, the personalization engine 514 determines neither the second nor the third rule applies because neither H inventory items nor I inventory items are present among the top products 522.

The personalization engine 514 determines whether a fourth rule of the rules 526 applies. For example, personalization engine 514 determines C inventory items are eligible as candidate products because of their inclusion in the top products 522. Since C inventory items are present among the top products 522, and a quantity of 5 C inventory items is greater than or equal to 5, the personalization engine 514 determines the fourth rule now applies. Thus, the personalization engine 514 determines campaign 2 should now be included in the results 528.

Similarly, the personalization engine 514 determines a fifth rule related to D inventory items. In this example, D inventory items, like C inventory items, now represent eligible candidate products because of their inclusion in top products 522. However, the fifth rule requires a number of D inventory items to be greater than or equal to 5, and there are only 4 D inventory items. Thus, the personalization engine 514 determines campaign 3 should not be included in the results 528. Once all of the rules 526 have been completed (e.g., analyzed), the personalization engine 514 sends the results 528 to content generation engine 516.

The content generation engine 416 receives the results 528 from the personalization engine 514. In this example, the results 528 includes campaign 1 and campaign 2. The content generation engine 516 generates new display content based on the change in the results 528 from the past results (e.g., results 428). For example, the content generation engine 516 can replace display content associated with campaign 5 (e.g., related to H inventory items) with newly added campaign 2 that includes display content related to C inventory items.

In this example, the content generation engine 516 generates and sends the display content to the display devices 530, 532 based on the results 528. The content generation engine 516 may also send the display content to client device 506. For example, the geo-fence system 508 may determine a presence of an end user using any of the techniques described herein. The content generation engine 516 can send personalized display content to client device 506 based on user preferences. The personalized display content may include a user notification.

Examples Process for Providing Content Using RFID Tags in Geo-Fenced Zones

Figure 6:
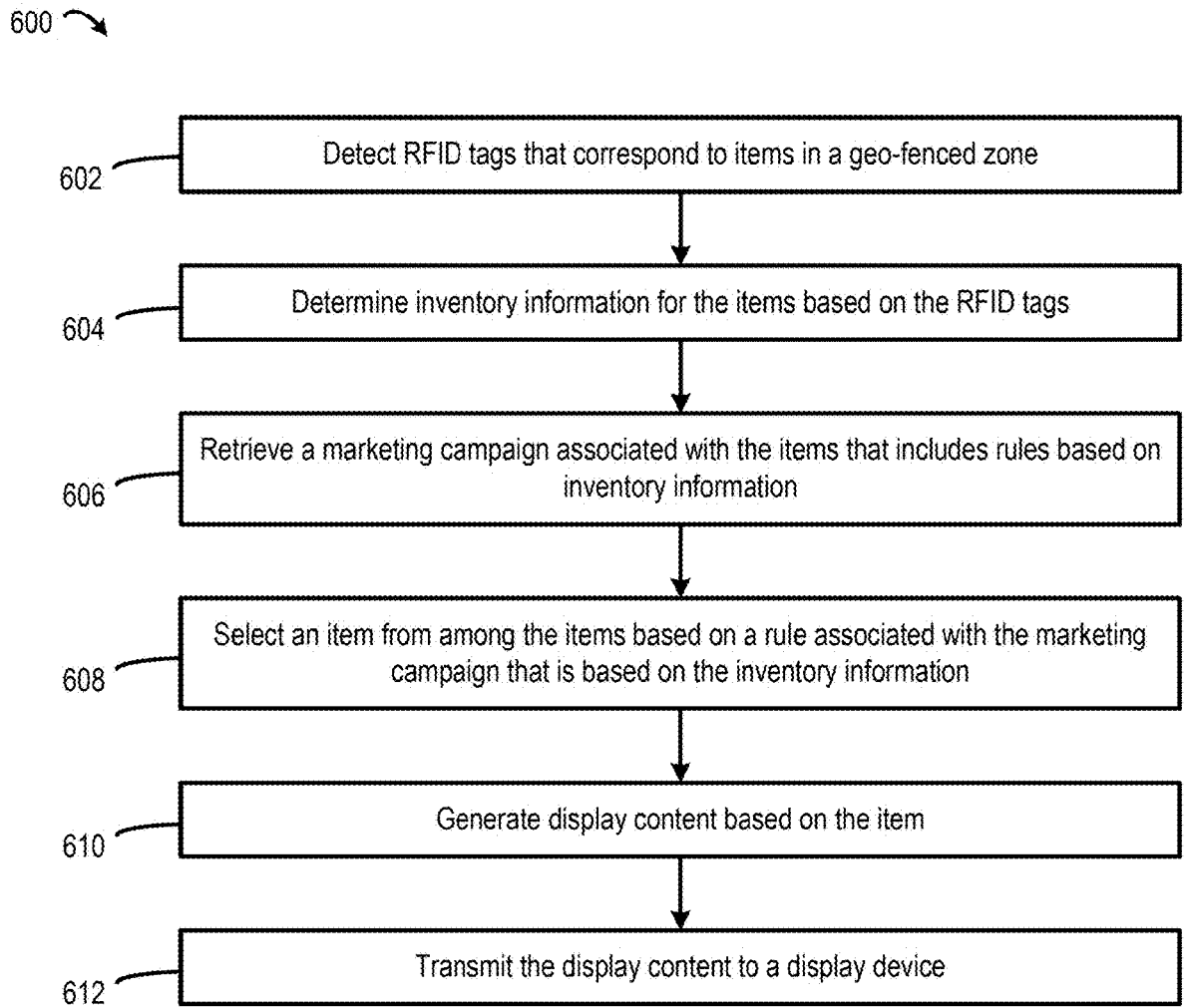
FIG. 6 depicts an example of a process for providing display content using RFID tags in geo-fenced zones, according to certain aspects of this disclosure.

FIG. 6 depicts an example process 600 for providing display content using RFID tags in geo-fenced zones, according to certain aspects of this disclosure. One or more operations described with respect to FIG. 6 can be used to implement a step for generating a message that include a subset of scanned items based on a criterion. In some aspects, one or more computing devices implement operations depicted in FIG. 6 by executing suitable program code (e.g., the geo-fence system 208, one or more of the engines depicted in FIG. 2, etc.). For illustrative purposes, the process 600 is described with reference to certain examples depicted in the figures. Other implementations, however, are possible.

At block 602, the process 600 involves scanning RFID tags that correspond to items in a geo-fenced zone. For example, the geo-fence system 208 receives data from a RFID antenna that strategically placed in a location based on a predetermined radius. The RFID antenna scans RFID tags associated with items within the predetermined radius. In some examples, the RFID antenna may include a dipole, helix, loop, multi-turn, dB, LF, HF, UHF, active, passive, BAP, or another suitable type of RFID antenna. In some examples, the RFID antenna scans the items based on an electrical signal from the geo-fence system 208.

For example, the geo-fence system 208 can use RFID reader 232 to send the electrical signal to the RFID antenna. The electrical signal triggers an electromagnetic interrogation pulse that scans all of the items. In one example, the RFID antenna includes a UHF antenna and transmits data, including the RFID tags, to RFID reader 232. The RFID reader 232 receives the RFID tags from the RFID antenna and reads or scans all of the RFID tags for each of the items. In some examples, the RFID antenna can scan RFID tags according to any of the techniques described herein.

At block 604, the process 600 involves determining inventory information for the items based on the RFID tags. For example, the analytics engine 210 obtains the RFID tags from the RFID reader 232 and determines inventory information for the items, e.g., based on the RFID tags from block 602. The analytics engine 210 may determine a count of like items based on one or more features associated with their RFID tags. The analytics engine 210 compiles the count of the items as inventory information.

In some examples, the analytics engine 210 may determine a number of items other than inventory items. The analytics engine 210 may determine inventory items such as forms of identification, keycards, electronic devices, other consumer goods, etc., or a combination of these. Further, the analytics engine 210 can generate inventory information using any of the techniques described herein. In some examples, the analytics engine 210 can report the inventory information to the web API 212, personalization engine 214, content generation unit 216, asset management server 224, another system component, etc.

At block 606, the process 600 involves retrieving a marketing campaign associated with the items that includes rules based on inventory information. In this example, the web API 212 receives inventory information from the analytics engine 210. The web API 212 may determine any suitable number of top items based on the inventory information. For example, the web API 212 may retrieve the marketing campaign based on a top 5 items. The web API 212 retrieves the marketing campaign from marketing campaign database 220 and sends the marketing campaign to the personalization engine 214.

At block 608, the process 600 involves selecting an item from among the items based on a rule associated with the marketing campaign that is based on the inventory information. The personalization engine 214 determines the current display content output to the display device 230 does not include the marketing campaign received from the web API 212. For example, the personalization engine 214 may determine the current display content does not include a top 5 item. In response, the personalization engine 214 determines the display content should be changed and sends instructions to content generation engine 216.

In some examples, the personalization engine 214 determines the top 5 items based on the RFID tags, e.g., based on inventory information (e.g., a top 5 items derived from a number of occurrences of scanned items). The personalization engine 214 can use a marketing campaigns that is associated with a set of rules to determine the instructions. In some examples, the personalization engine 214 determines a set of results based on inventory information, the top 5 items, marketing campaigns, the set of rules, etc., or a combination of these. In this example, the personalization engine 214 determines an item (e.g., a result) by applying the set of rules to the marketing campaigns (e.g., using the top 5 items). Once selected, the personalization engine 214 sends the selected item to content generation engine 216.

At block 610, the process 600 involves generating display content based on the item. The marketing system 222 can use the selected item from block 608 to generate the display content. For example, the content generation engine 216 receives the instructions to change the display content from the personalization engine 214, e.g., to include more relevant display content. Relevance may be based on top items, inventory information, marketing campaigns, campaign rules, user profiles or preferences, etc. The content generation engine 216 may determine an arrangement of display content based on relevance. Further, the content generation engine 216 can generate display content using any techniques described herein.

At block 612, the process 600 involves transmitting the display content to a display device. For example, the geo-fence system 208 can send the display content to the display device 230. The geo-fence system 208 is in electrical communication with the display device 230. Further, the geo-fence system 208 uses content generation engine 216 to send the display content to the display device 230. In some examples, the content generation engine 216 may also send the display content to client device 206. Further, the display content sent to the client device 206 may also include a user notification.

Figure 7:
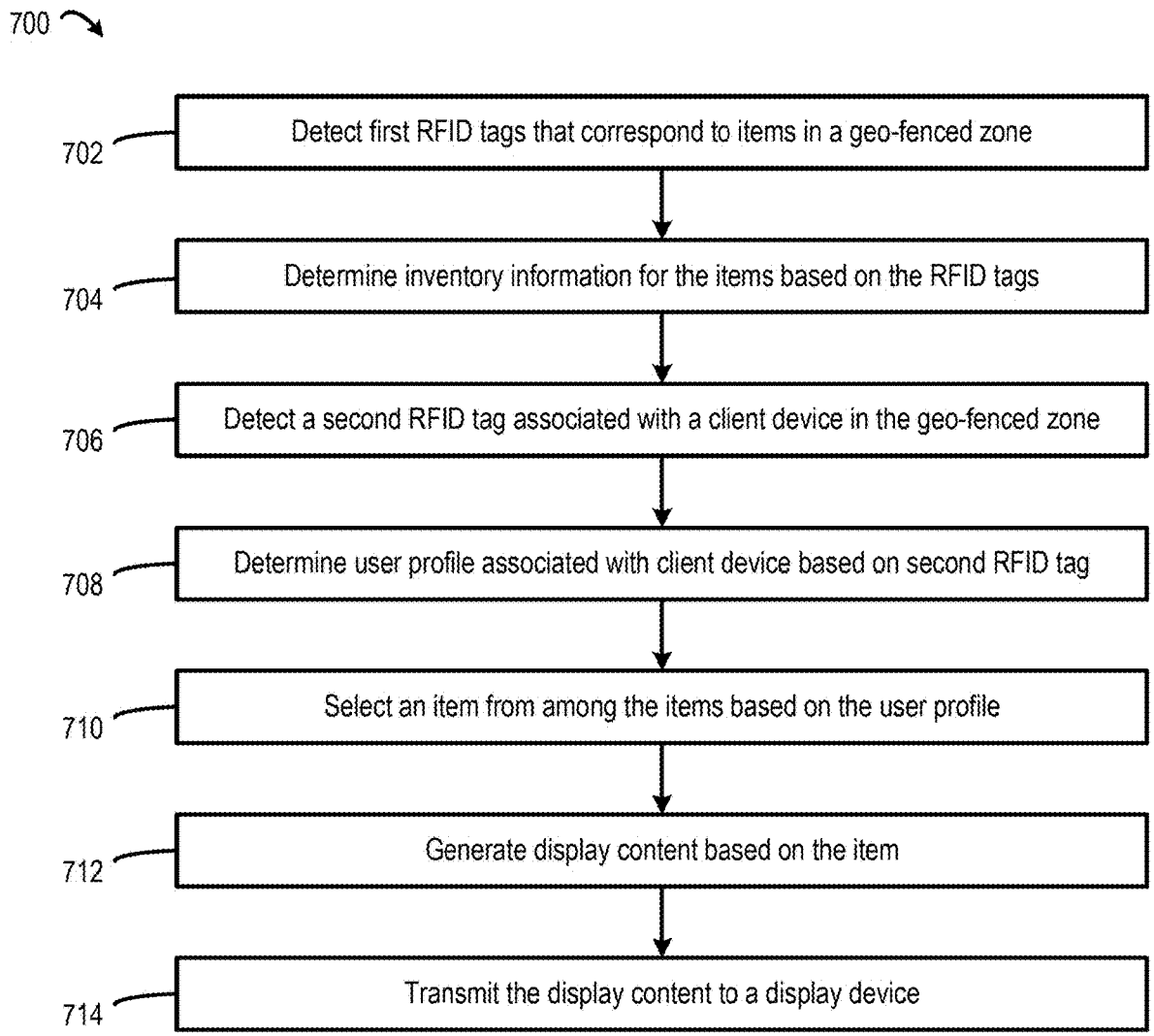
FIG. 7 depicts another example of a process for providing display content using RFID tags in geo-fenced zones, according to certain aspects of this disclosure.

FIG. 7 depicts an example process 700 for providing display content using RFID tags in geo-fenced zones, according to certain aspects of this disclosure. One or more operations described with respect to FIG. 7 can be used to implement a step for generating a message that include a subset of scanned items based on a criterion. In some aspects, one or more computing devices implement operations depicted in FIG. 7 by executing suitable program code (e.g., the geo-fence system 208, one or more of the engines depicted in FIG. 2, etc.). For illustrative purposes, the process 700 is described with reference to certain examples depicted in the figures. Other implementations, however, are possible.

At block 702, the process 700 involves scanning first RFID tags that correspond to items in a geo-fenced zone. For example, the geo-fence system 208 receives data from a RFID antenna that scans first RFID tags associated with items within the predetermined radius. In some examples, the RFID antenna scans the items based on an electrical signal from the geo-fence system 208, which can trigger a scanning of all of the items. The RFID antenna may include a UHF antenna and transmit the first RFID tags to RFID reader 232. The RFID reader 232 receives the first RFID tags and reads or scans the RFID tag for each item.

At block 704, the process 700 involves determining inventory information for the items based on the first RFID tags. For example, the analytics engine 210 determines inventory information for the items based on the first RFID tags from block 702. The analytics engine 210 determines a count of the items and generates the inventory information. The analytics engine 210 can generate inventory information using any of the techniques described herein. In some examples, the analytics engine 210 reports the inventory information to web API 212, personalization engine 214, content generation unit 216, asset management server 224, etc.

At block 706, the process 700 involves scanning a second RFID tag associated with a client device in the geo-fenced zone. For example, the geo-fence system 208 may scan the location periodically (e.g., at a predetermined interval or time duration). The geo-fenced system 208 can send an electrical signal to a RFID antenna to determine whether any end users are in the vicinity. In one example, the RFID antenna scans a presence of client device 206 based on a second RFID tag associated with client device 206. The RFID antenna can send RFID tag information associated with the second RFID tag to the RFID reader 232 using any suitable technique described herein.

At block 708, the process 700 involves determining a user profile associated with the client device based on the second RFID tag. Further, the analytics engine 210 receives RFID tag information associated with the second RFID tag from the RFID antenna. The analytics engine 210 may determine whether the client device 206 is associated with an end user. For example, the analytics engine 210 can use the RFID tag information associated with the second RFID tag to query user database 218 to determine whether the client device 206 is associated with a known user profile (e.g., a registered or previous customer). The analytics engine 210 receives a user profile from the user database 218 that is associated with the client device 206 based on the second RFID tag. The analytics engine 210 determines a presence of the end user 204 and sends the user profile to the content generation engine 216.

At block 710, the process 700 involves selecting an item from among the items based on the user profile. For example, the content generation engine 216 receives the user profile from analytics engine 210 that includes user preferences. The content generation engine 216 determines whether the user preferences are related to any of the items associated with the first RFID tags. In this example, the content generation engine 216 determines the user preferences are related an item from among the items associated with the first RFID tags. In response, the content generation engine 216 can modify display content or generate personalized display content for the end user 204, e.g., based on the user preferences.

At block 712, the process 700 involves generating display content based on the item. For example, the geo-fence system 208 can use content generation engine 216 to generate the display content to the display device 230. In some examples, the display content may include a notification. For example, the notification may include an item of interest to the end user 204, such as an item that is on sale, an event notification, or another notification. The content generation engine 216 can send personalized display content to the client device 206.

At block 714, the process 700 involves transmitting the display content to a display device. For example, the geo-fence system 208 is in electrical communication with the display device 230. The geo-fence system 208 can send the display content to the display device 230 using content generation engine 216. In some examples, the content generation engine 216 may also send the display content to client device 206. Further, the display content sent to the client device 206 may include a notification. In some examples, the content generation engine 216 may send personalized display content to the client device 206.

In one example, the personalized display content may be protected by the geo-fence system 208. For example, the content generation engine 216 can protect the privacy of end user 204 by sending a notification of the impending personalized display content prior to its arrival. Further, the notification may include a request for permission to send the personalized display content. In some examples, content generation engine 216 may not send the personalized display content unless or until a user grants permission (e.g., "accepts" the personalized display content). Further, content generation engine 216 can protect the privacy of end user 204 by only sending the personalized display content to client device 206 (e.g., and not sending the personalized display content to display device 230 or another client device).

Example of a Computing System for Implementing Certain Aspects

Figure 8:
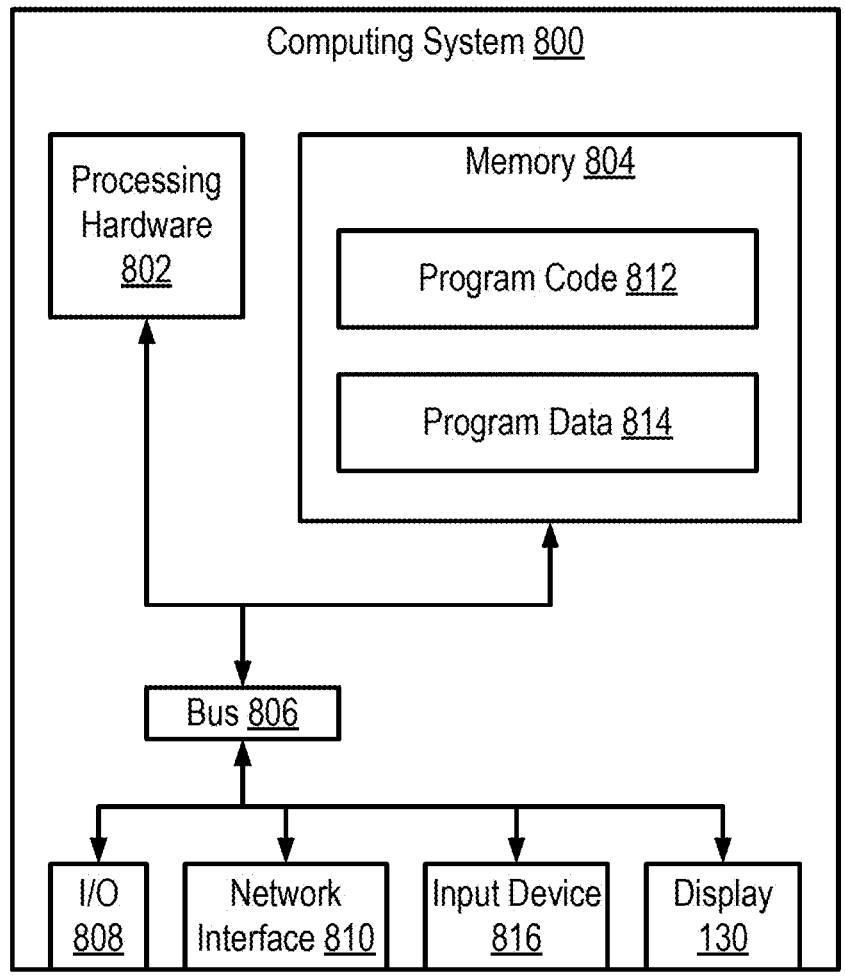
FIG. 8 depicts an example of a computing system for implementing one or more aspects of this disclosure.

Any suitable computing system or group of computing systems can be used for performing the operations described herein. For example, FIG. 8 depicts an example of a computing system 800 for providing display content using RFID tags in geo-fenced zones. In some aspects, the computing system 800 includes processing hardware 802 that executes program code 812, a memory device 804 that stores one or more sets of program data 814 computed or used by operations in the program code 812 (e.g., user information, marketing campaign information, product information, top product information, etc.), one or more input devices 816, and one or more display devices 230 for displaying graphical content generated by executing the program code 812. For illustrative purposes, FIG. 8 depicts a single computing system on which the program code 812 is executed, the program data 814 is stored, and the input devices 816 and display device 230 are present. But various applications, datasets, and devices described can be stored or included across different computing systems having devices similar to the devices depicted in FIG. 8.

The depicted example of a computing system 800 includes processing hardware 802 communicatively coupled to one or more memory devices 804. The processing hardware 802 executes computer-executable program code stored in memory device 804, accesses information stored in memory device 804, or both. Examples of processing hardware 802 include a microprocessor, application-specific integrated circuit ("ASIC"), field-programmable gate array ("FPGA"), or another suitable processing device. Processing hardware 802 can include a single processing device or any number of processing devices.

The memory device 804 includes any suitable non-transitory computer-readable medium for storing data, program code, or both. A computer-readable medium can include any electronic, optical, magnetic, or other storage device capable of providing a processor with computer-readable instructions or other program code 812. Non-limiting examples of a computer-readable medium include a magnetic disk, memory chip, ROM, RAM, ASIC, optical storage, magnetic tape, another magnetic storage, or any other medium from which a processing device can read instructions. Program code 812 may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 816, a display device 230, or other input or output devices. For example, the computing system 800 is shown with one or more input/output ("I/O") interfaces 808. An I/O interface 808 can receive input from input devices (e.g., input device 816) or provide output to output devices (e.g., display device 230). One or more buses 806 are also included in the computing system 800. The bus 806 communicatively couples one or more components of a respective one of the computing system 800.

The computing system 800 executes program code 812 that configures the processing hardware 802 to perform operations described herein. The program code 812 includes, for example, analytics engine 210, Web API 212, personalization engine 214, content generation engine 216, or other suitable program code that performs one or more operations described herein. The program code 812 may be resident in the memory device 804 or any suitable computer-readable medium and may be executed by the processing hardware 802 or any other suitable processor. The program code 812 uses or generates program data 814. Examples of the program data 814 include one or more of the user information, marketing campaign information, product information, top product information, location information, layout information, campaigns, rules, results, etc. described herein with respect to FIGS. 1-6.

In some aspects, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, or the like. The computing system 800 is able to communicate with one or more other computing devices via a data network using the network interface device 810.

An input device 816 can include any device or group of devices suitable for receiving visual, auditory, or other suitable input that controls or affects the operations of the processing hardware 802. Non-limiting examples of the input device 816 include a recording device, touchscreen, mouse, keyboard, microphone, video camera, separate mobile computing device, etc. A display device 230 can include any device or group of devices suitable for providing visual, auditory, or other suitable sensory output. Non-limiting examples of the display device 230 include a touchscreen, monitor, separate mobile computing device, etc.

Although FIG. 8 depicts the input device 816 and the display device 230 as being local to the computing device that executes the program code 812, other implementations are possible. For instance, in some aspects, one or more of the input device 816 and the display device 230 can include a remote client-computing device that communicates with computing system 800 via network interface device 810 using one or more data networks described herein.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement teachings contained herein in software to be used in programming or configuring a computing device. The order of blocks presented in the examples above can be varied—for example, blocks can be re-ordered, combined, and/or broken into sub-blocks. Certain blocks or processes can be performed in parallel.

The invention claimed is:

1. A method in which one or more processing devices performs operations comprising:
    scanning, via a radio frequency identifier (RFID) reader device, RFID tags in a geo-fenced zone associated with a display device, wherein the RFID tags correspond to and identify a plurality of items;
    retrieving a marketing campaign associated with the plurality of items;
    determining inventory information for each item of the plurality of items corresponding to a number of scanned RFID tags corresponding to each item;
    selecting an item from among the plurality of items corresponding to the scanned RFID tags based on a rule associated with the marketing campaign, wherein the rule is based on the inventory information;
    generating display content for the display device corresponding to the geo-fenced zone, based on the selected item; and
    displaying, via the display device within the geo-fenced zone, the generated display content.

2. The method of claim 1, wherein the inventory information comprises, for each of the plurality of items, one or more of location information, an item count, a price, or an item label.

3. The method of claim 1, the operations further comprising:
    transmitting the display content to a remote computing device; and
    displaying the display content on the remote computing device.

4. The method of claim 1, the operations further comprising:
  determining an availability of the plurality of items based on the inventory information; and
  selecting the item from among the plurality of items further based on the availability.

5. The method of claim 1, wherein the item is a first item, the rule is a first rule, the operations further comprising:
  selecting a second item from among the plurality of items based on a second rule associated with the marketing campaign; and
  determining an arrangement of the display content based on the marketing campaign, wherein the display content comprises the first item and the second item.

6. The method of claim 1, the operations further comprising:
  detecting a client device within a geo-fenced zone associated with the display device;
  identifying a user profile associated with the client device, the user profile identifying products of interest to the user;
  determining an arrangement of the display content based on the user profile.

7. The method of claim 1, the operations further comprising:
  detecting a client device within a geo-fenced zone associated with the display device;
  identifying a user profile associated with the client device, the user profile identifying products of interest to the user, the user profile comprising a purchase history;
  selecting the item from among the plurality of items based in part on the purchase history.

8. The method of claim 1, the operations further comprising:
  detecting a client device within a geo-fenced zone associated with the display device;
  identifying a user profile associated with the client device, the user profile identifying products of interest to the user, the user profile comprising a browsing history;
  determining the item is an item of interest based on the browsing history; and
  generating a notification based on an availability of the item of interest, wherein the notification includes a message that the item of interest is available for purchase.

9. The method of claim 1, wherein the display device displays the display content, the operations further comprising:
  polling the RFID tags in the geo-fenced zone at a predetermined time interval;
  determining a change in a number of the plurality of items based on the polling;
  updating the inventory information based on the change in the number of the plurality of items;
  selecting a subsequent item of the plurality of items other than the selected item, based on the rule associated with the marketing campaign, and the updated inventory information; and
  generating updated display content based on the selected subsequent item, wherein the display device displays the updated display content.

10. A system comprising:
  a sensor;
  one or more processing devices communicatively coupled to the sensor; and
  a non-transitory computer-readable medium communicatively coupled to the one or more processing devices and storing instructions, wherein the one or more processing devices are configured to execute the instructions and thereby perform operations comprising:
    scanning, via a radio frequency identifier (RFID) reader device, RFID tags in a geo-fenced zone associated with a display device, wherein the RFID tags correspond to and identify a plurality of items;
    retrieving a marketing campaign associated with the plurality of items;
    determining inventory information for each item of the plurality of items corresponding to a number of scanned RFID tags corresponding to each item;
    selecting an item from among the plurality of items corresponding to the scanned RFID tags based on a rule associated with the marketing campaign, wherein the rule is based on the inventory information;
    generating display content for the display device corresponding to the geo-fenced zone, based on the selected item; and
    displaying, via the display device within the geo-fenced zone, the generated display content.

11. The system of claim 10, wherein the inventory information comprises, for each of the plurality of items, one or more of location information, an item count, a price, or an item label.

12. The system of claim 10, the operations further comprising:
  transmitting the display content to a remote computing device; and
  displaying the display content on the remote computing device.

13. The system of claim 10, the operations further comprising:
  determining an availability of the plurality of items based on the inventory information; and
  selecting the item from among the plurality of items further based on the availability.

14. The system of claim 10, wherein the item is a first item, the rule is a first rule, the operations further comprising:
  selecting a second item from among the plurality of items based on a second rule associated with the marketing campaign; and
  determining an arrangement of the display content based on the marketing campaign, wherein the display content comprises the first item and the second item.

15. The system of claim 10, the operations further comprising:
  detecting a client device within a geo-fenced zone associated with the display device;
  identifying a user profile associated with the client device, the user profile identifying products of interest to the user;
  determining an arrangement of the display content based on the user profile.

16. The system of claim 10, the operations further comprising:
  detecting a client device within a geo-fenced zone associated with the display device;
  identifying a user profile associated with the client device, the user profile identifying products of interest to the user, the user profile comprising a purchase history;
  selecting the item from among the plurality of items based in part on the purchase history.

17. The system of claim 10, the operations further comprising:
- detecting a client device within a geo-fenced zone associated with the display device;
- identifying a user profile associated with the client device, the user profile identifying products of interest to the user, the user profile comprising a browsing history;
- determining the item is an item of interest based on the browsing history; and
- generating a notification based on an availability of the item of interest, wherein the notification includes a message that the item of interest is available for purchase.

18. A system comprising:
- means for scanning, via a radio frequency identifier (RFID) reader device, RFID tags in a geo-fenced zone associated with a display device, wherein the RFID tags correspond to and identify a plurality of items;
- means for retrieving a marketing campaign associated with the plurality of items;
- means for determining inventory information for each item of the plurality of items corresponding to a number of scanned RFID tags corresponding to each item;
- means for selecting an item from among the plurality of items corresponding to the scanned RFID tags based on a rule associated with the marketing campaign, wherein the rule is based on the inventory information;
- means for generating display content for the display device corresponding to the geo-fenced zone, based on the selected item; and
- means for displaying, via the display device within the geo-fenced zone, the generated display content.

19. The system of claim 18, wherein the inventory information comprises, for each of the plurality of items, one or more of location information, an item count, a price, or an item label.

20. The system of claim 18, further comprising:
- means for transmitting the display content to a remote computing device; and
- means for displaying the display content on the remote computing device.

* * * * *